United States Patent
Sudo

(10) Patent No.: US 11,762,177 B2
(45) Date of Patent: Sep. 19, 2023

(54) ZOOM LENS AND IMAGE PICKUP APPARATUS HAVING THE SAME

(71) Applicant: CANON KABUSHIKI KAISHA, Tokyo (JP)

(72) Inventor: Kenta Sudo, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/931,950

(22) Filed: Jul. 17, 2020

(65) Prior Publication Data

US 2020/0348495 A1 Nov. 5, 2020

Related U.S. Application Data

(63) Continuation of application No. PCT/JP2019/001107, filed on Jan. 16, 2019.

(30) Foreign Application Priority Data

Jan. 19, 2018 (JP) ................... 2018-007517

(51) Int. Cl.
*G02B 15/177* (2006.01)
*G02B 13/00* (2006.01)
(Continued)

(52) U.S. Cl.
CPC ......... *G02B 15/177* (2013.01); *G02B 13/009* (2013.01); *G02B 13/02* (2013.01); *G02B 27/0062* (2013.01); *H04N 23/69* (2023.01)

(58) Field of Classification Search
CPC .... G02B 15/177; G02B 13/009; G02B 13/02; G02B 27/0062; G02B 15/145121; G02B 15/20; H04N 5/23296
See application file for complete search history.

(56) References Cited

U.S. PATENT DOCUMENTS 10,061,114 B2 8/2018 Sudo
10,197,778 B2 2/2019 Sudo et al.
(Continued)

FOREIGN PATENT DOCUMENTS

CN 1942803 A 4/2007
CN 101718902 A 6/2010
(Continued)

OTHER PUBLICATIONS

International Preliminary Report of Patentability issued by the Japan Patent Office dated Jul. 30, 2020 in corresponding International Application No. PCT/JP2019/001107, with English translation.
(Continued)

*Primary Examiner* — Alicia M Harrington
(74) *Attorney, Agent, or Firm* — Carter, DeLuca & Farrell LLP

(57) ABSTRACT

The zoom lens includes, in order from object side to image side, a positive first lens unit, a negative second lens unit, a positive third lens unit, and a rear lens group including at least one lens unit, in which intervals between adjacent lens units are changed during zooming. The third lens unit includes at least two negative lenses and at least three positive lenses. An average value of partial dispersion ratios of two negative lenses having strongest refractive powers of the at least two negative lenses, an average value of partial dispersion ratios of three positive lenses having strongest refractive powers of the at least three positive lenses, an average value of Abbe numbers of the two negative lenses, an average value of Abbe numbers of the three positive lenses, a back focus, and a focal length of zoom lens at wide angle end are appropriately set.

15 Claims, 17 Drawing Sheets

(51) Int. Cl.
*G02B 13/02* (2006.01)
*G02B 27/00* (2006.01)
*H04N 23/69* (2023.01)
*H04N 5/232* (2006.01)

(56) References Cited

U.S. PATENT DOCUMENTS

| | | | | |
|---|---|---|---|---|
| 10,545,335 | B2 | 1/2020 | Sudo | |
| 2008/0043344 | A1* | 2/2008 | Ohtake | G02B 15/144113 359/692 |
| 2011/0019033 | A1* | 1/2011 | Ori | G02B 15/145121 359/683 |
| 2011/0273776 | A1* | 11/2011 | Obama | G02B 15/16 359/581 |
| 2015/0370041 | A1* | 12/2015 | Noda | G02B 15/14 359/683 |
| 2018/0081156 | A1* | 3/2018 | Suzuki | H04N 23/69 |
| 2018/0246304 | A1* | 8/2018 | Tomioka | G02B 15/173 |
| 2020/0271924 | A1 | 8/2020 | Abe et al. | |

FOREIGN PATENT DOCUMENTS

| | | | | |
|---|---|---|---|---|
| CN | 105467564 | A | | 4/2016 |
| EP | 2175300 | A1 | * 4/2010 | ..... G02B 15/144113 |
| JP | 2004286811 | A | | 10/2004 |
| JP | 2006243355 | A | | 9/2006 |
| JP | 2007065525 | A | | 3/2007 |
| JP | 2011-186417 | A | | 9/2011 |
| JP | 2013250339 | A | | 12/2013 |
| JP | 2016045297 | A | | 4/2016 |
| JP | 2016-181078 | A | | 10/2016 |
| JP | 2017-134304 | A | | 8/2017 |
| JP | 2017181720 | A | | 10/2017 |
| JP | 2018-045157 | A | | 3/2018 |

OTHER PUBLICATIONS

International Search Report issued by the Japan Patent Office dated Apr. 2, 2019 in corresponding International Application No. PCT/JP2019/001107, with English translation.
Notification of the First Office Action issued by the China National Intellectual Property Administration dated Jul. 5, 2021 in corresponding CN Patent Application No. 201980009081.2, with English translation.
Notice of Reasons for Refusal issued by the Japan Patent Office dated Dec. 23, 2021 in corresponding JP Patent Application No. 2018-007517, with English translation.
Notice of Reasons for Refusal issued by the Japan Patent Office dated Oct. 4, 2022 in corresponding JP Patent Application No. 2018-007517, pp. 1-7, with English translation.
Notice of Reasons for Refusal issued by the Japan Patent Office dated Jan. 5, 2023 in corresponding JP Patent Application No. 2018-007517, pp. 1-6, with English translation.

* cited by examiner

ZOOM LENS AND IMAGE PICKUP APPARATUS HAVING THE SAME

CROSS-REFERENCE TO RELATED APPLICATIONS

This application is a Continuation of International Patent Application No. PCT/JP2019/001107, filed Jan. 16, 2019, which claims the benefit of Japanese Patent Application No. 2018-007517, filed Jan. 19, 2018, both of which are hereby incorporated by reference herein in their entirety.

BACKGROUND OF THE INVENTION

Field of the Invention

The present invention relates to a zoom lens, and more particularly, to a zoom lens suitable as an image pickup optical system for use in an image pickup apparatus, such as a digital still camera, a video camera, a monitoring camera, and a broadcasting camera.

Description of the Related Art

As a zoom lens for use in an image pickup apparatus, a zoom lens having a high zoom ratio and good optical performance over the entire zoom range while being compact is required.

As such a zoom lens, there is known a positive-lead type zoom lens including a first lens unit having a positive refractive power.

In Japanese Patent Application Laid-Open No. 2016-45297, there is disclosed an Example including a first lens unit to a fourth lens unit having positive, negative, positive, and positive refractive powers, and having a zoom ratio of about 30 times.

In Japanese Patent Application Laid-Open No. 2007-65525, there is disclosed an Example including a first lens unit to a fifth lens unit having positive, negative, positive, positive, and positive refractive powers, and having a zoom ratio of about 17 times.

In an image pickup apparatus, particularly such as a monitoring camera, in order to acquire a clear image of an object even in a situation with a small light amount, such as at night, there are cases in which the object is irradiated with near-infrared light having a wavelength of about 850 nm, and an image is taken with use of reflected light from the object.

It is also required to acquire an image having a high resolution even under situations in which both of visible light and the near-infrared light exist in a mixed manner, such as during hours from the daytime to the night.

Therefore, a zoom lens with which chromatic aberration in a wavelength range of from the visible light to the near-infrared light is well corrected over the entire zoom range is required.

However, with the zoom lenses disclosed in Japanese Patent Application Laid-Open No. 2016-45297 and Japanese Patent Application Laid-Open No. 2007-65525, chromatic aberration is not sufficiently corrected over a wide wavelength range including the near-infrared light.

SUMMARY OF THE INVENTION

An aspect of embodiments provides, for example, a zoom lens beneficial in a high optical performance, compactness and a high zoom ratio thereof. An aspect of embodiments provides a zoom lens including, in order from an object side to an image side, a first lens unit having a positive refractive power, a second lens unit having a negative refractive power, a third lens unit having a positive refractive power, and a rear lens group including at least one lens unit, in which an interval between each pair of adjacent lens units is changed during zooming. The third lens unit includes at least two negative lenses and at least three positive lenses. The zoom lens satisfies the following conditions:

$$-0.0030 \leq (\theta Ctn_{ave} - \theta Ctp_{ave})/(vdn_{ave} - vdp_{ave}) \leq 0.0040;$$

$$30.0 \leq vdn_{ave} \leq 75.0;$$

$$0.3 \leq BF/fw \leq 3.0,$$

where $\theta Ctn_{ave}$ represents an average value of partial dispersion ratios of materials of two negative lenses having the strongest refractive powers of the at least two negative lenses, $\theta Ctp_{ave}$ represents an average value of partial dispersion ratios of materials of three positive lenses having the strongest refractive powers of the at least three positive lenses, $vdn_{ave}$ represents an average value of Abbe numbers of the materials of the two negative lenses, $vdp_{ave}$ represents an average value of Abbe numbers of the materials of the three positive lenses, BF represents a back focus, and fw represents a focal length of the zoom lens at a wide angle end.

Further features of the present invention will become apparent from the following description of exemplary embodiments with reference to the attached drawings.

DESCRIPTION OF THE EMBODIMENTS

Figure 1:
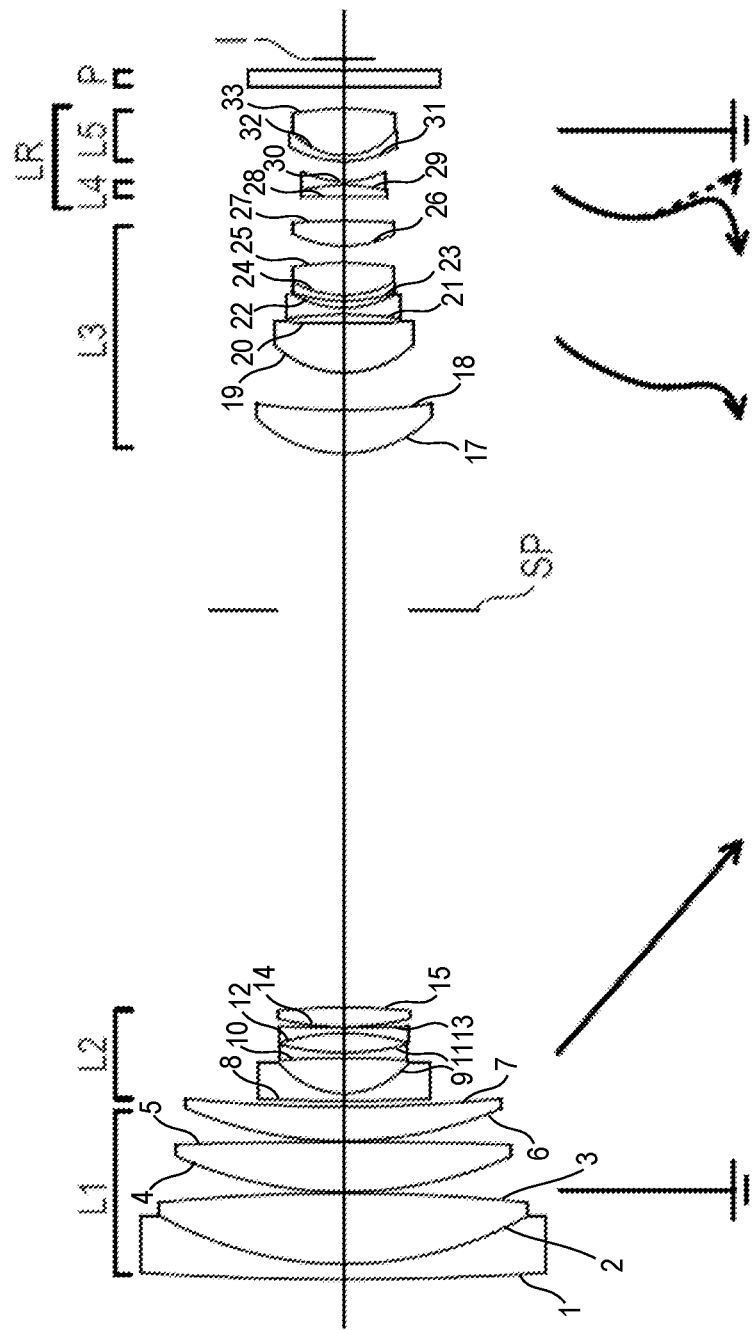
FIG. 1 is a view for illustrating a lens cross section and movement loci in Example 1 of the present invention at a wide angle end.
Figure 2:
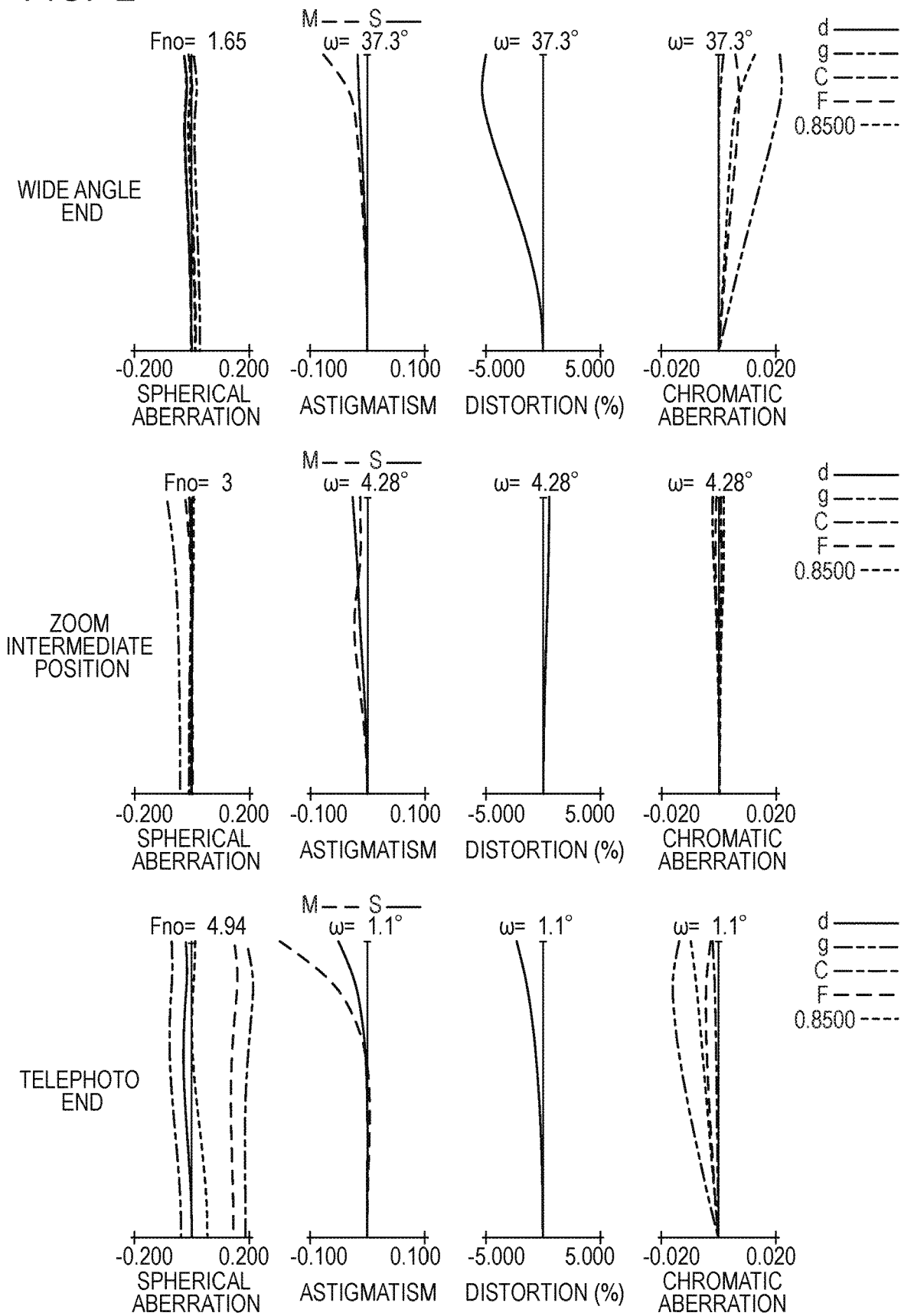
FIG. 2 shows aberration diagrams in Example 1 at the wide angle end, a zoom intermediate position, and a telephoto end.
Figure 3:
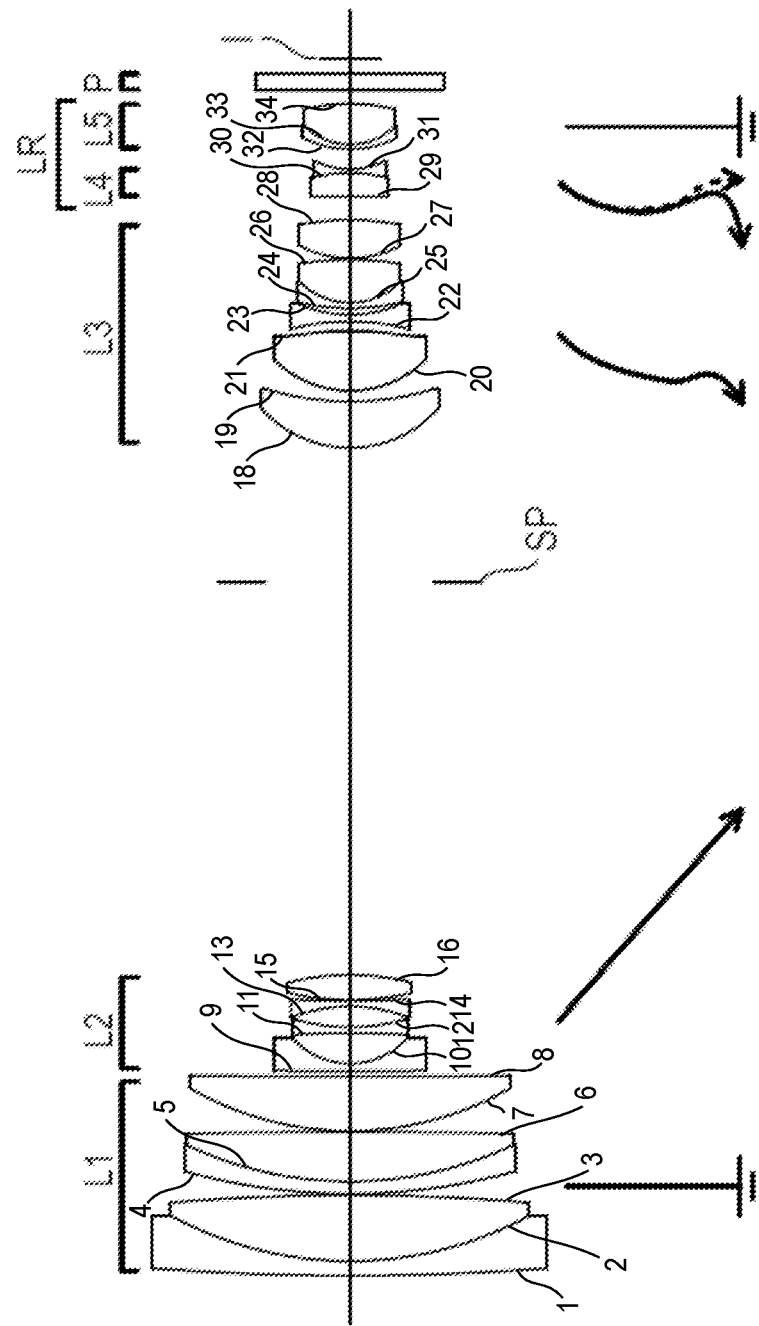
FIG. 3 is a view for illustrating a lens cross section and movement loci in Example 2 of the present invention at a wide angle end.
Figure 4:
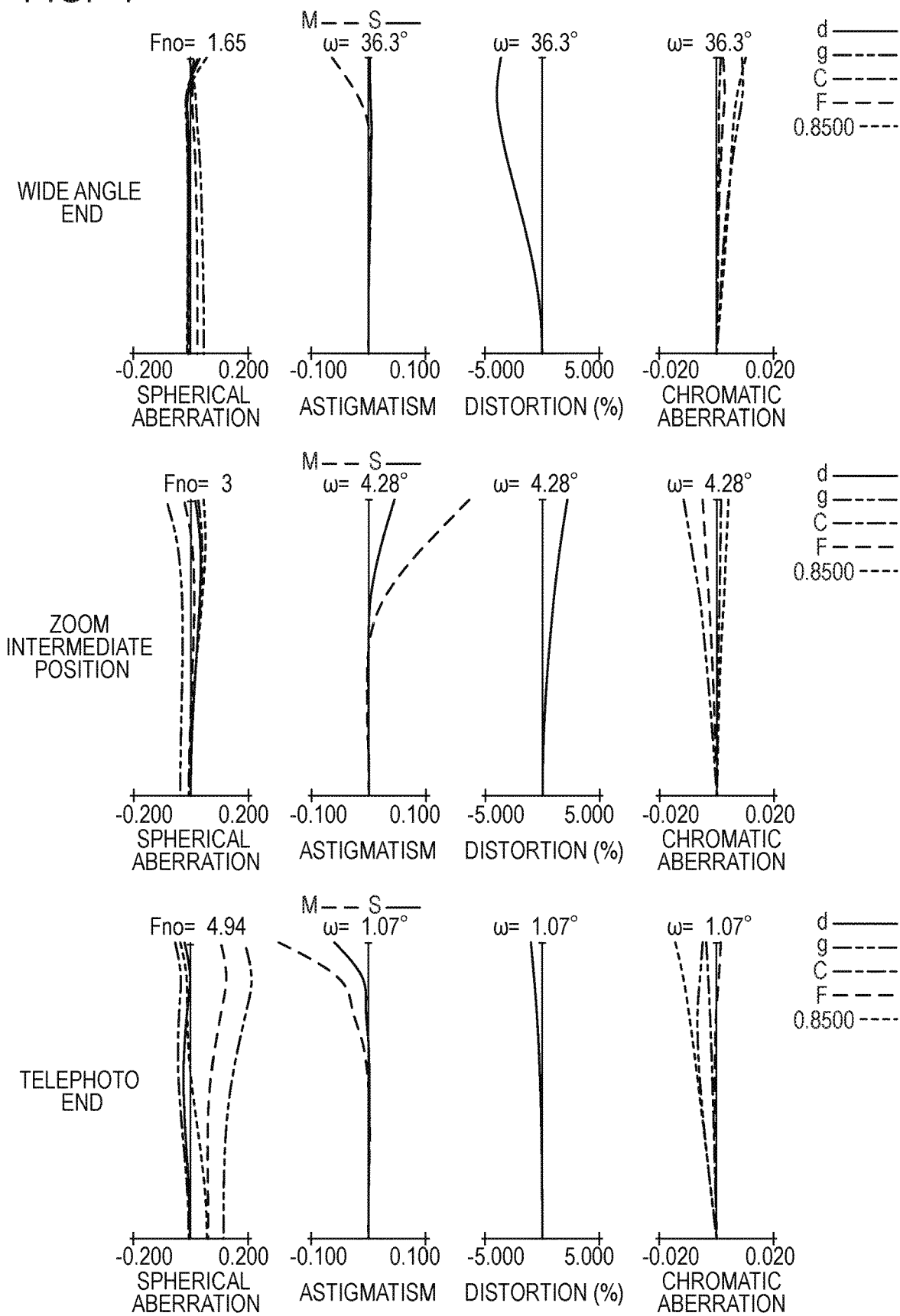
FIG. 4 shows aberration diagrams in Example 2 at the wide angle end, a zoom intermediate position, and a telephoto end.
Figure 5:
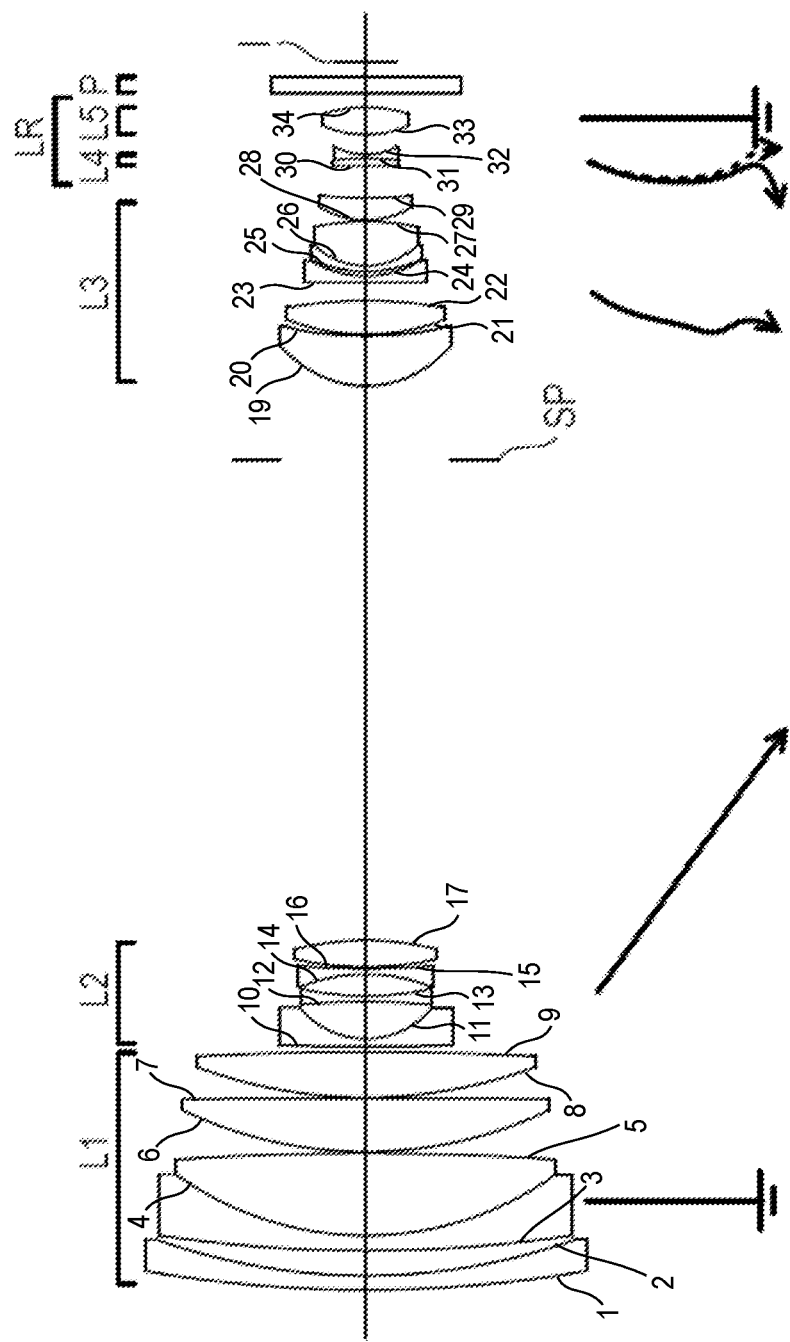
FIG. 5 is a view for illustrating a lens cross section and movement loci in Example 3 of the present invention at a wide angle end.
Figure 6:
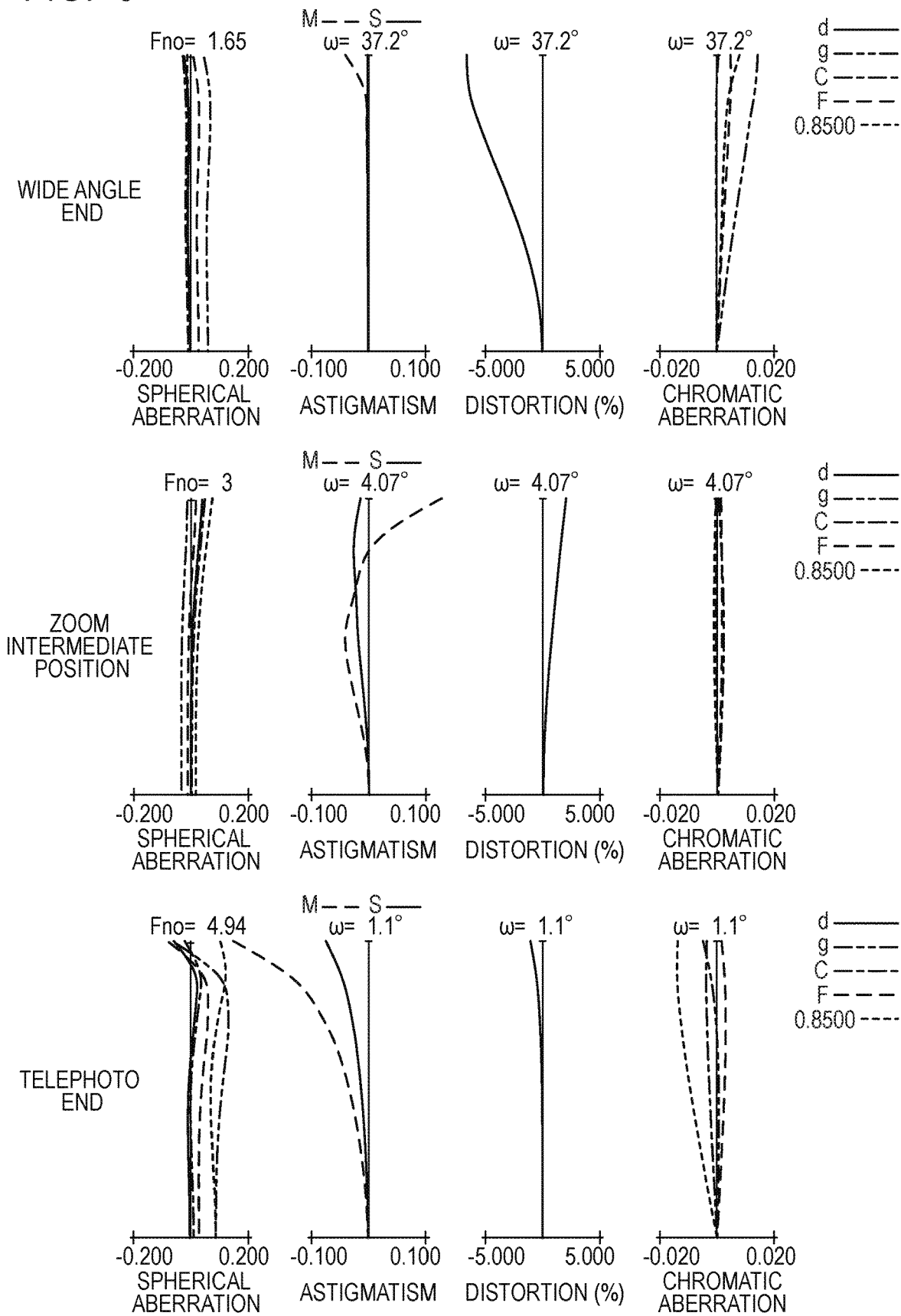
FIG. 6 shows aberration diagrams in Example 3 at the wide angle end, a zoom intermediate position, and a telephoto end.
Figure 7:
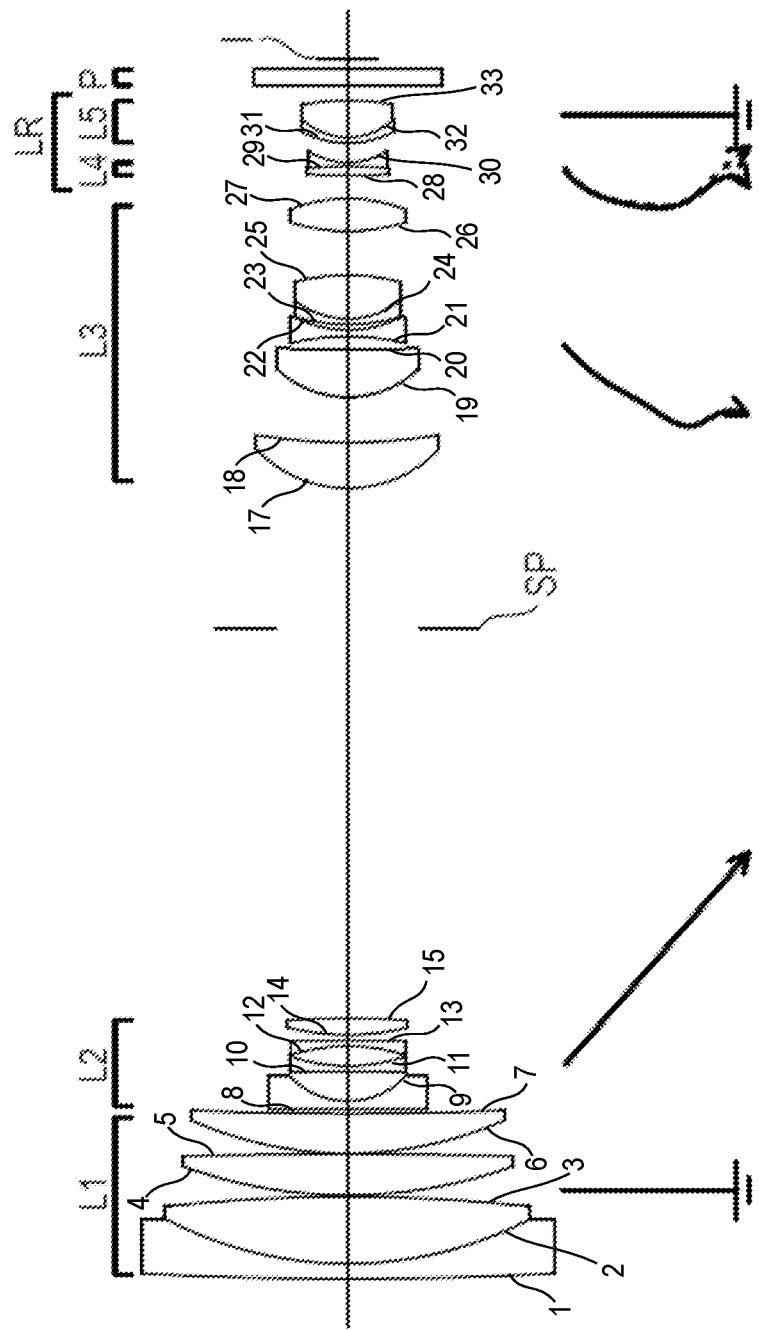
FIG. 7 is a view for illustrating a lens cross section and movement loci in Example 4 of the present invention at a wide angle end.
Figure 8:
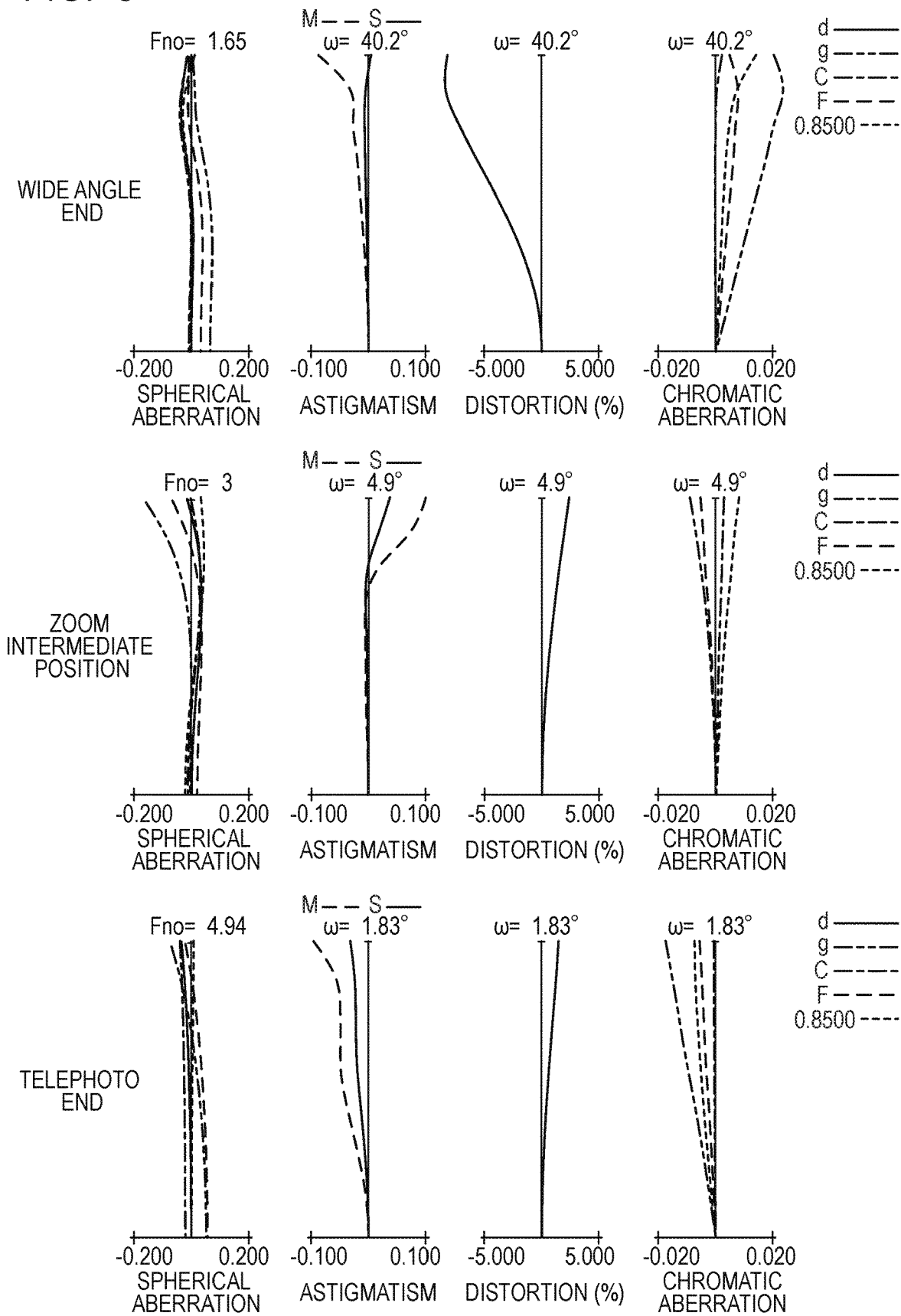
FIG. 8 shows aberration diagrams in Example 4 at the wide angle end, a zoom intermediate position, and a telephoto end.
Figure 9:
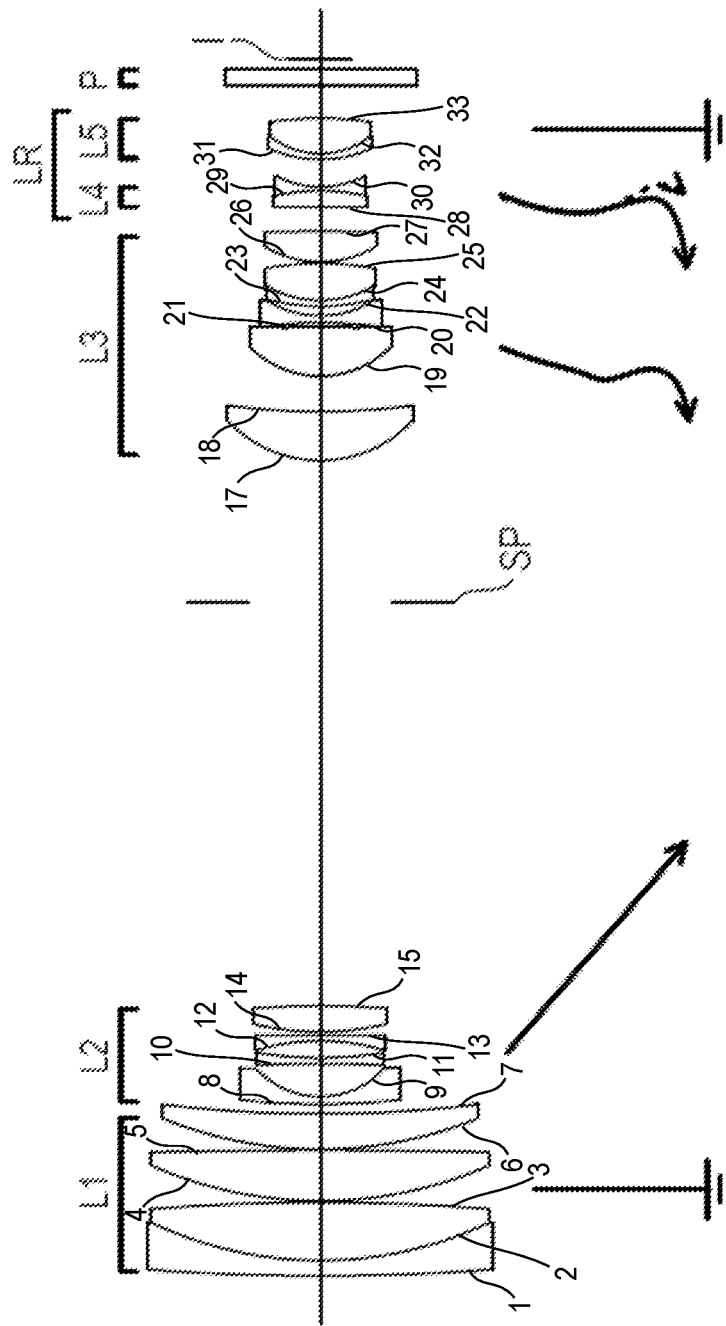
FIG. 9 is a view for illustrating a lens cross section and movement loci in Example 5 of the present invention at a wide angle end.
Figure 10:
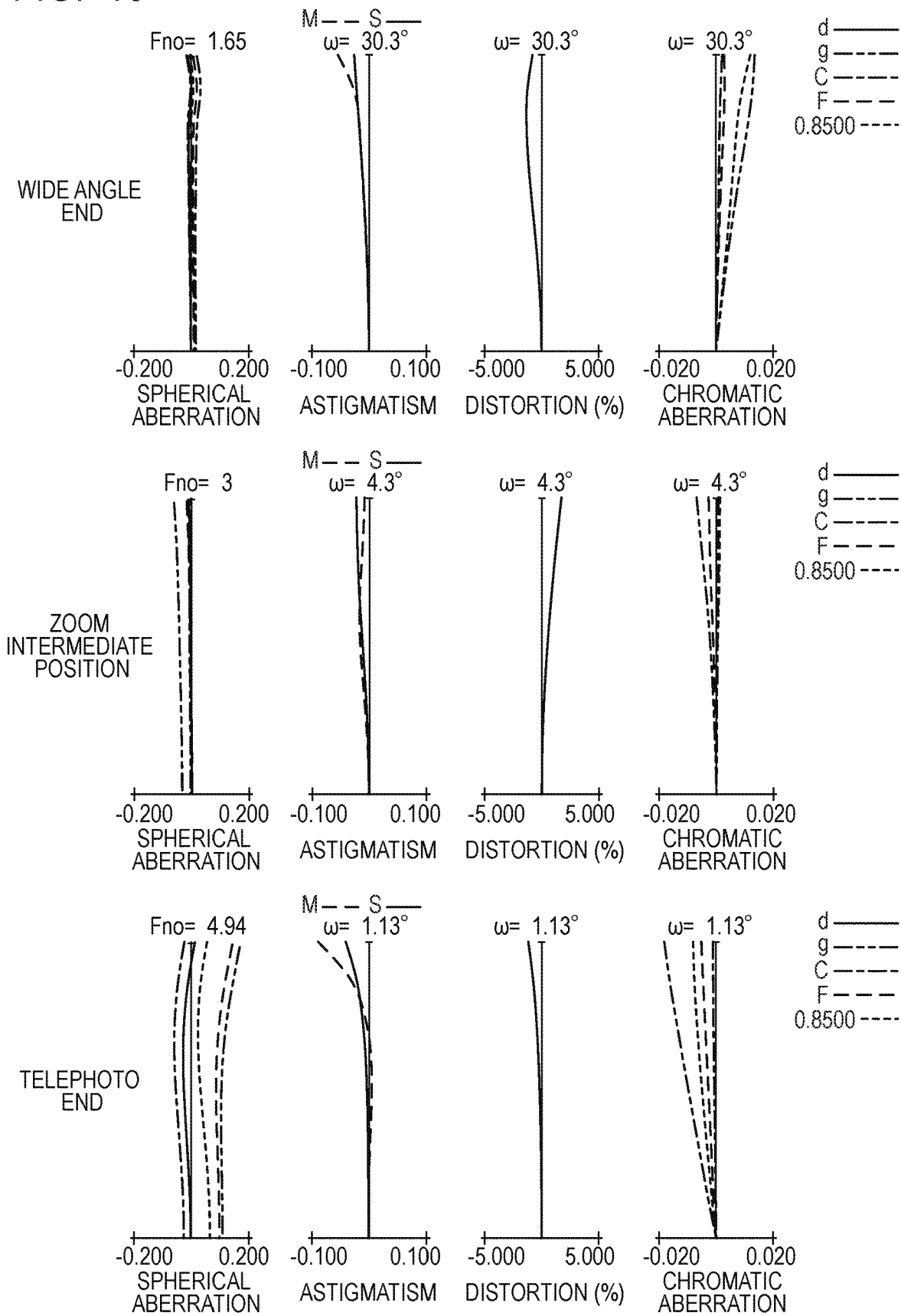
FIG. 10 shows aberration diagrams in Example 5 at the wide angle end, a zoom intermediate position, and a telephoto end.
Figure 11:
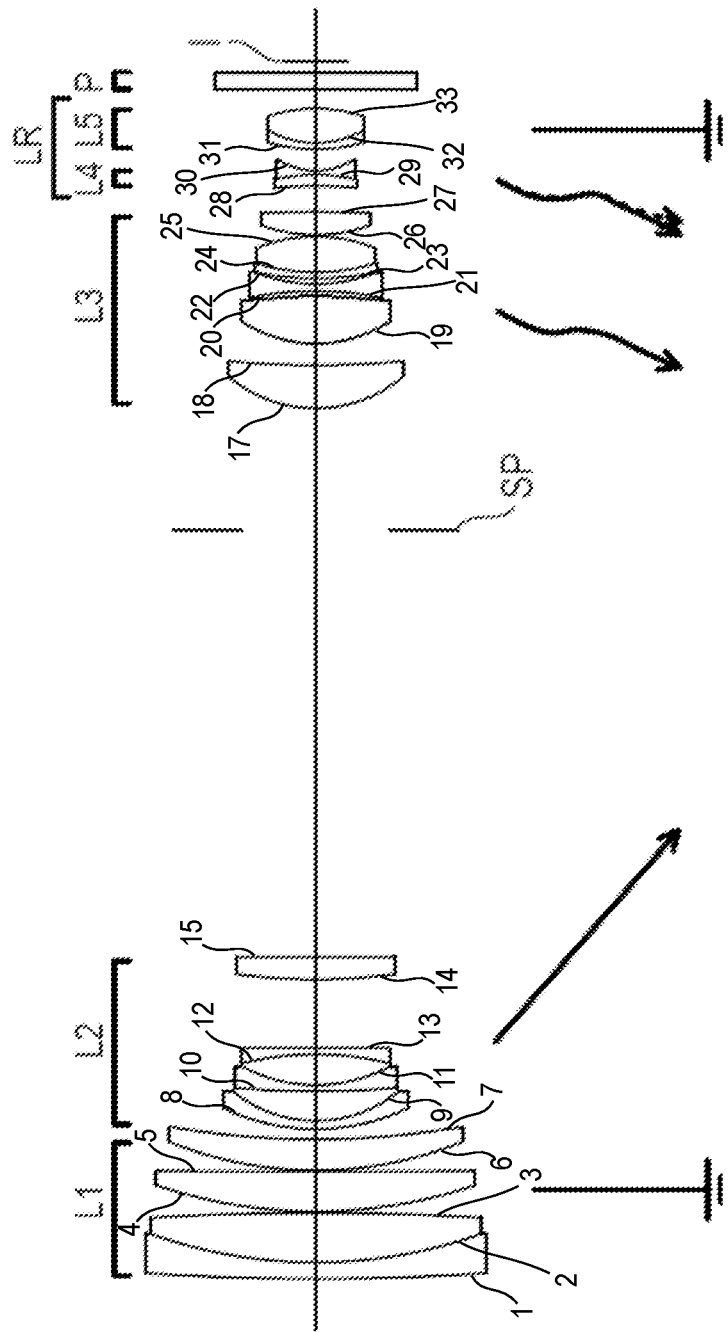
FIG. 11 is a view for illustrating a lens cross section and movement loci in Example 6 of the present invention at a wide angle end.
Figure 12:
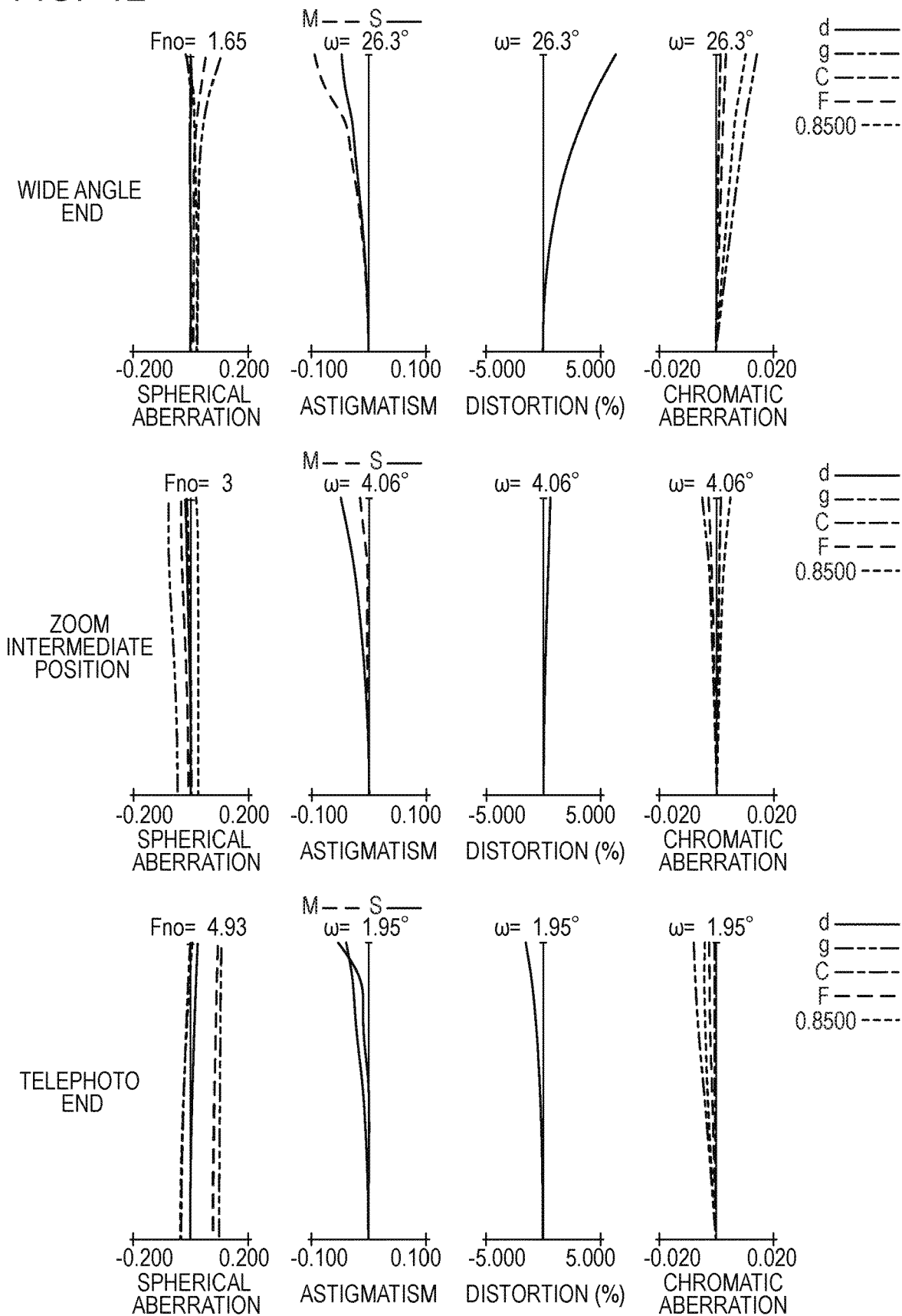
FIG. 12 shows aberration diagrams in Example 6 at the wide angle end, a zoom intermediate position, and a telephoto end.
Figure 13:
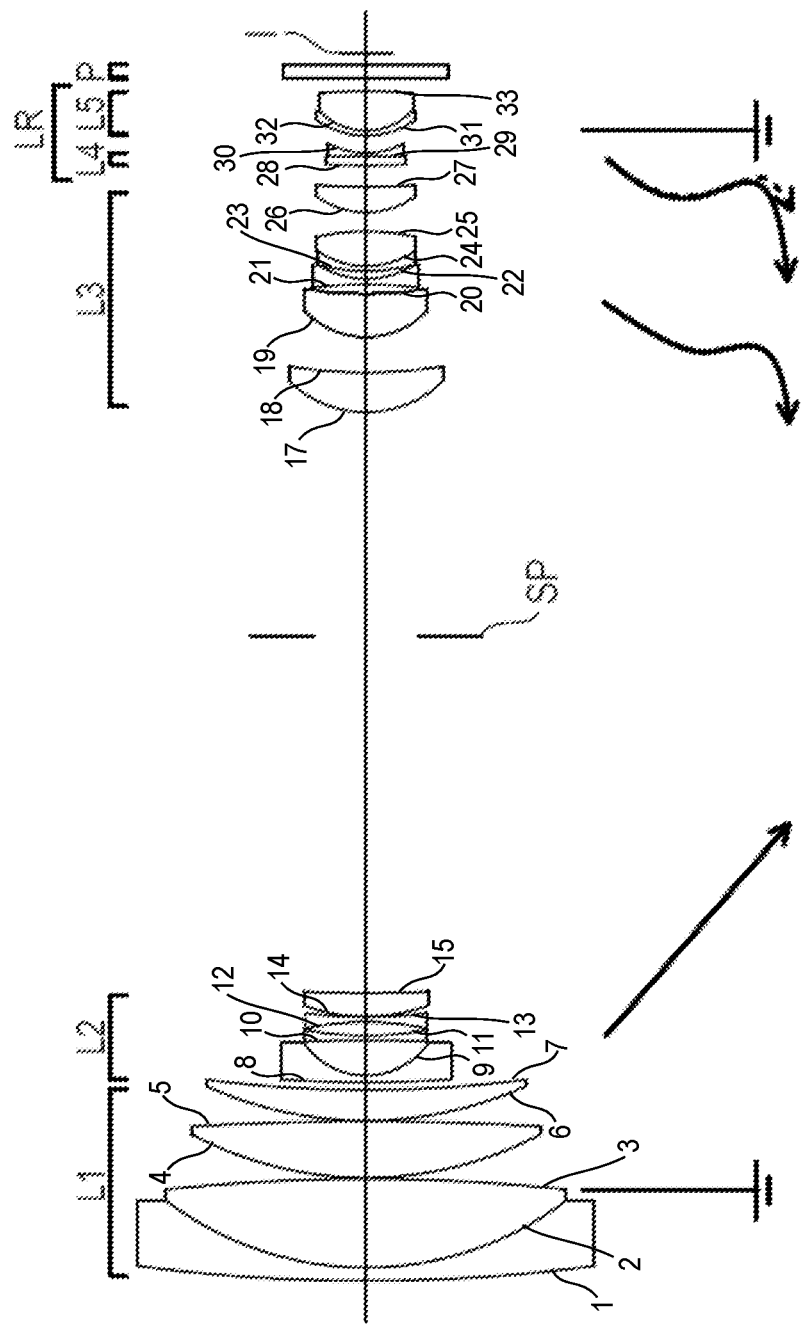
FIG. 13 is a view for illustrating a lens cross section and movement loci in Example 7 of the present invention at a wide angle end.
Figure 14:
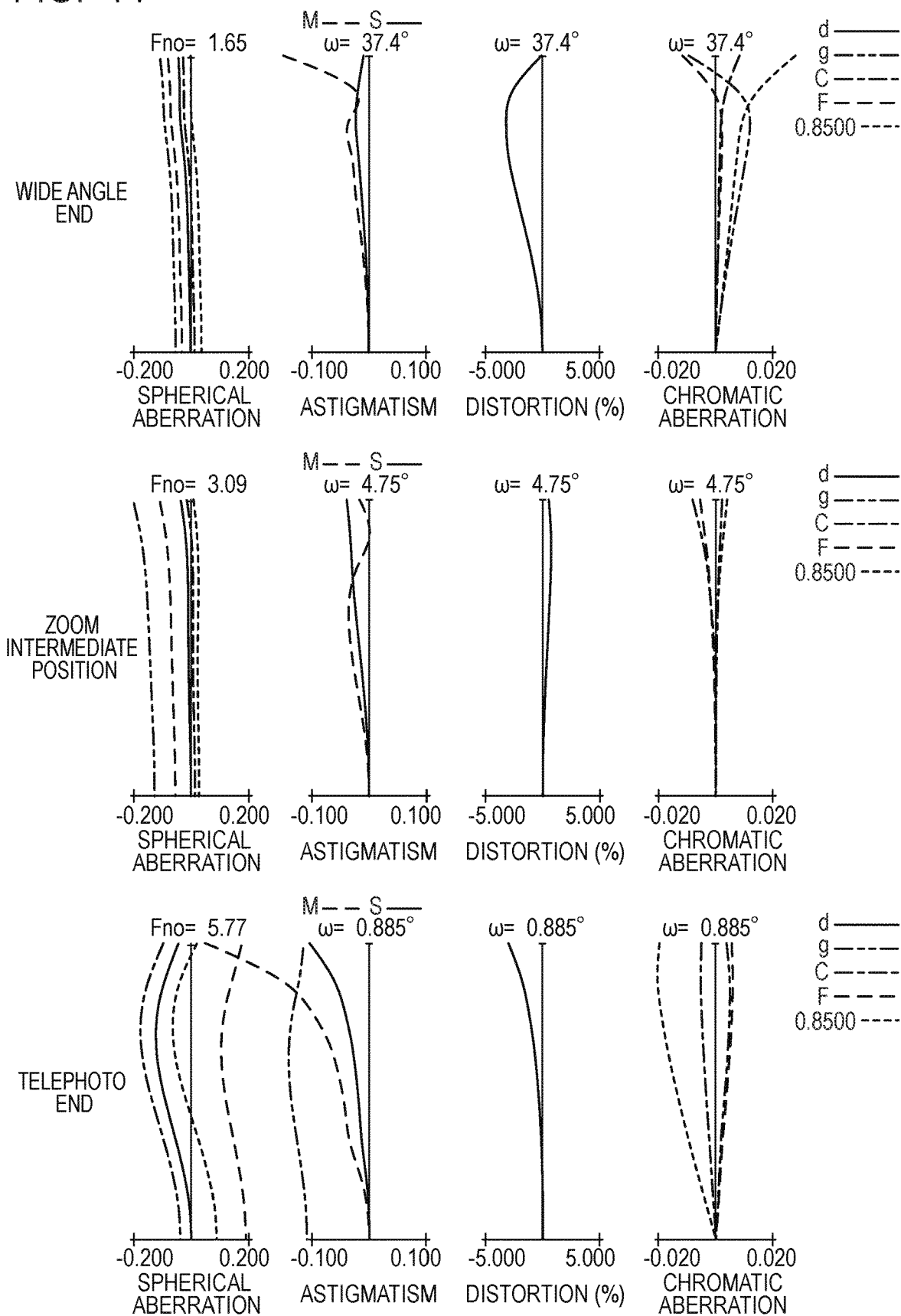
FIG. 14 shows aberration diagrams in Example 7 at the wide angle end, a zoom intermediate position, and a telephoto end.
Figure 15:
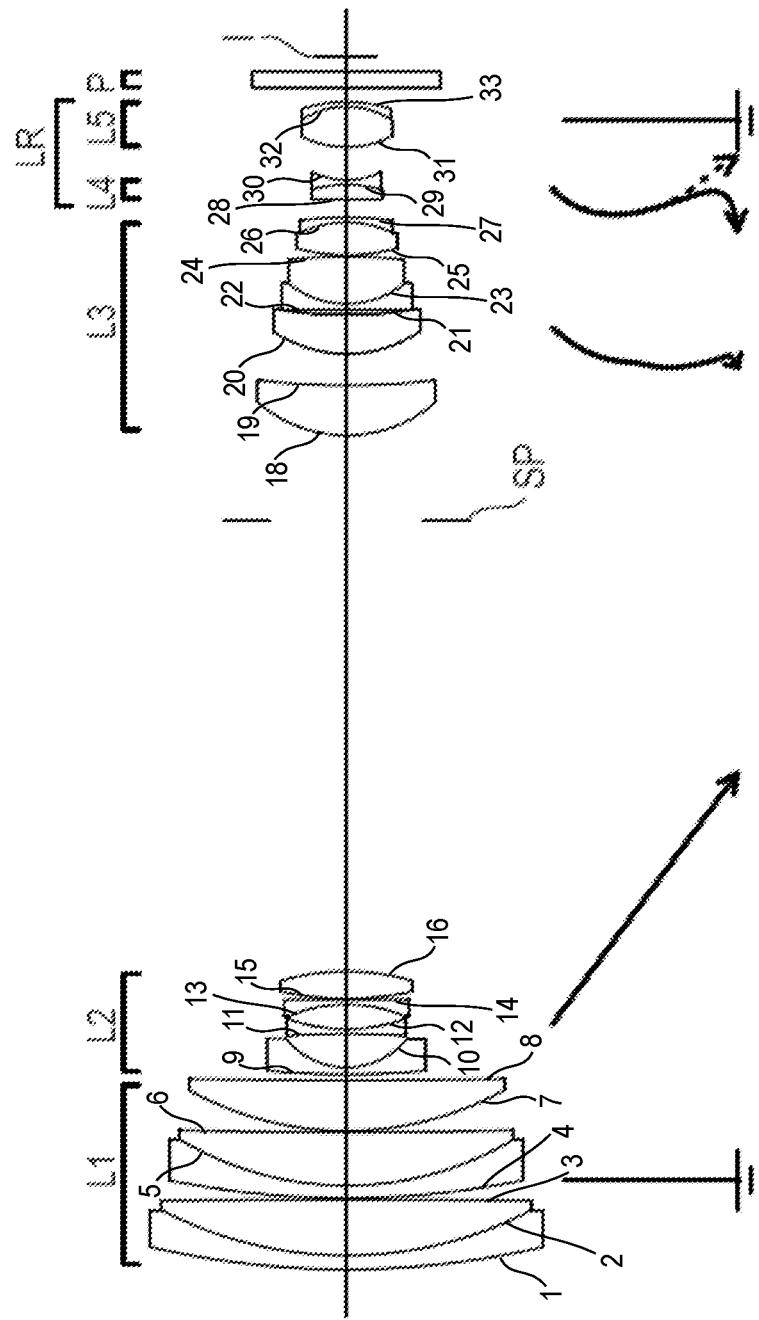
FIG. 15 is a view for illustrating a lens cross section and movement loci in Example 8 of the present invention at a wide angle end.
Figure 16:
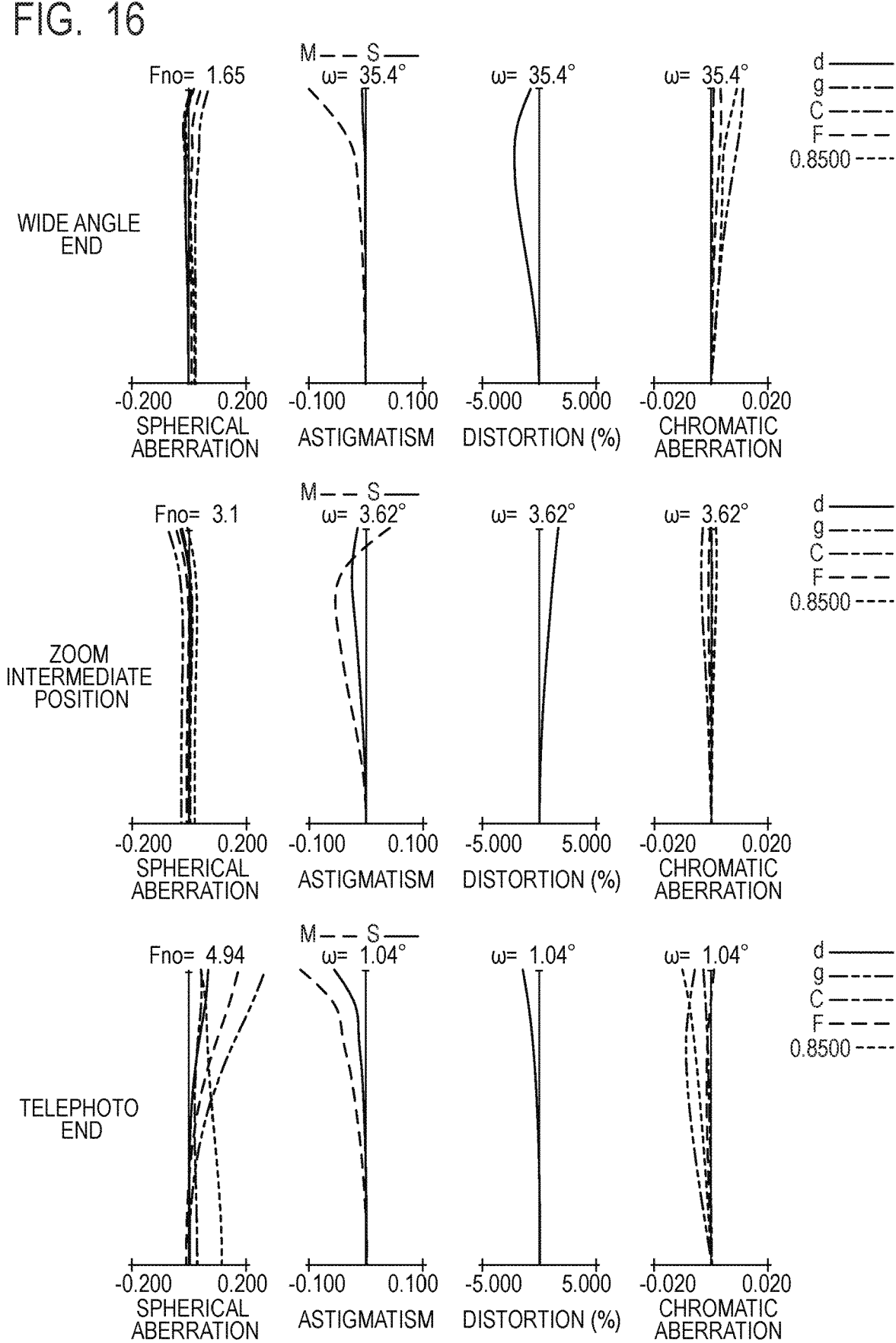
FIG. 16 shows aberration diagrams in Example 8 at the wide angle end, a zoom intermediate position, and a telephoto end.

Now, a zoom lens according to the present invention is described in detail with reference to the accompanying drawings. The drawings to be referred to below may not be drawn to scale in order to facilitate understanding of the present invention.

The present invention has an object to provide a zoom lens with which chromatic aberration is well corrected in a wavelength range of from visible light to near-infrared light while the zoom lens is compact and has a high zoom ratio, and an image pickup apparatus including the zoom lens.

The zoom lens according to the present invention includes, in order from an object side to an image side: a first lens unit L1 having a positive refractive power; a second lens unit L2 having a negative refractive power; a third lens unit L3 having a positive refractive power; and a rear lens group LR including at least one lens unit, in which an interval between each pair of adjacent lens units is changed during zooming.

The third lens unit L3 includes at least two negative lenses and at least three positive lenses. Further, the first lens unit L1 is configured not to move during zooming.

An average value (hereinafter referred to as "average partial dispersion ratio") of partial dispersion ratios of materials of two negative lenses having the highest refractive powers of the negative lenses included in the third lens unit L3 is represented by $\theta Ctn_{ave}$, and an average partial dispersion ratio of materials of three positive lenses having the highest refractive powers of the positive lenses included in the third lens unit L3 is represented by $\theta Ctp_{ave}$.

Further, an average value (hereinafter referred to as "average Abbe number") of Abbe numbers of the materials of the two negative lenses having the highest refractive powers of the negative lenses included in the third lens unit L3 is represented by $vdn_{ave}$, and an average Abbe number of the materials of the three positive lenses having the highest refractive powers of the positive lenses included in the third lens unit L3 is represented by $vdp_{ave}$.

Then, the zoom lens according to the present invention satisfies the following conditional expressions.

$$-0.0030 \leq (\theta Ctn_{ave} - \theta Ctp_{ave})/(vdn_{ave} - vdp_{ave})$$
$$\leq 0.0040 \quad (1)$$

$$30.0 \leq vdn_{ave} \leq 75.0 \quad (2)$$

In order to be compact as an entire system of the zoom lens, ensure the high zoom ratio, and well correct aberrations, the zoom lens according to the present invention consists of, in order from the object side, lens units having positive, negative, and positive refractive powers, and a rear lens group.

Further, with the at least two negative lenses and the at least three positive lenses being arranged in the third lens unit L3 having a high axial marginal ray height at a wide angle end, the zoom lens according to the present invention reduces curvatures of lens surfaces to suppress generation of spherical aberration. Still further, with the combination of the negative lenses and the positive lenses, axial chromatic aberration is well corrected.

Yet further, through satisfying the above-mentioned conditional expressions (1) and (2), the present invention can achieve the zoom lens with which chromatic aberration is well corrected in the wavelength range of from the visible light to the near-infrared light while the zoom lens is compact and has the high zoom ratio.

Next, the above-mentioned conditional expression (1) is described with reference to FIG. 18.

Figure 18:
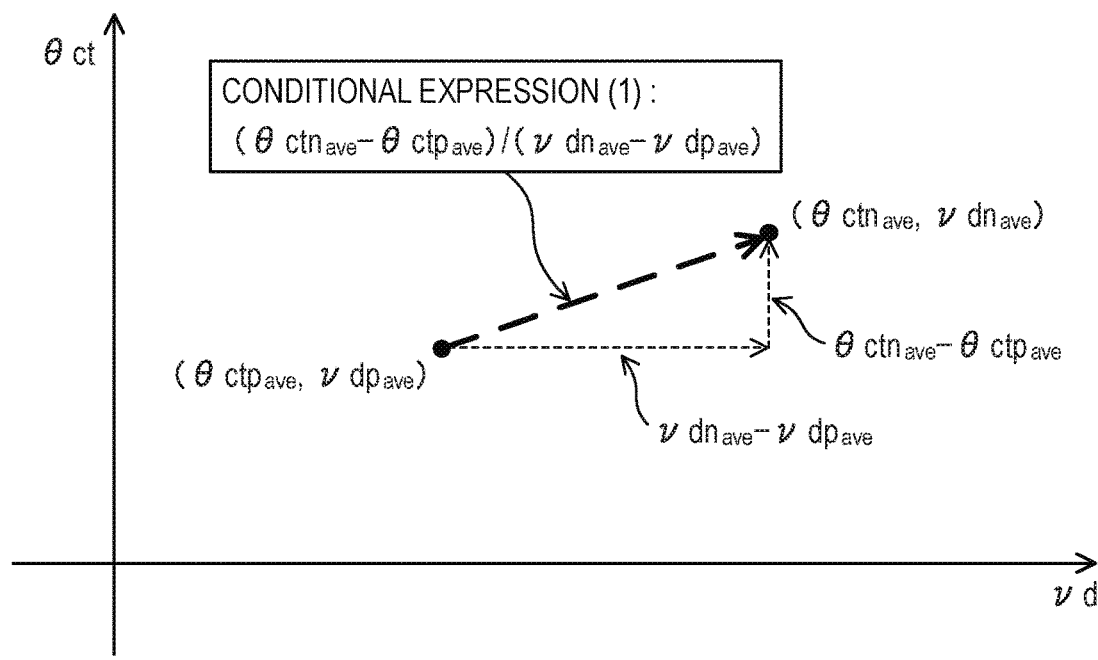
FIG. 18 is an explanatory graph of a conditional expression (1).

FIG. 18 is a graph for showing a relationship between an Abbe number vd and a partial dispersion ratio θct with respect to a C-line and a t-line.

The Abbe number vd and the partial dispersion ratio θCt are given as the following expressions (A) and (B), respectively:

$$vd = (nd-1)/(nF-nC) \quad (A); \text{ and}$$

$$\theta Ct = (nC-nt)/(nF-nC) \quad (B).$$

In the expressions, nF, nd, nC, and nt represent refractive indices with respect to an F-line (486.1 nm), a d-line (587.6 nm), the C-line (656.3 nm), and the t-line (1,013.98 nm) of the Fraunhofer lines, respectively.

In FIG. 18, there is shown a point N having, as coordinate values thereof, an average partial dispersion ratio $\theta Ctn_{ave}$ and an average Abbe number $vdn_{ave}$ of materials of two negative lenses LN1 and LN2 having the highest refractive powers (largest absolute values of the refractive powers) (that is, the negative lens LN1 having the highest refractive power and the negative lens LN2 having the second highest refractive power) of the negative lenses included in the third lens unit L3.

There is also shown a point P having, as coordinate values thereof, an average partial dispersion ratio $\theta Ctp_{ave}$ and an average Abbe number $vdp_{ave}$ of materials of three positive lenses LP1, LP2 and LP3 having the highest refractive powers (largest absolute values of the refractive powers) (that is, the positive lens LP1 having the highest refractive power, the positive lens LP2 having the second highest refractive power, and the positive lens LP3 having the third highest refractive power) of the positive lenses included in the third lens unit L3.

The refractive powers of the negative lenses LN1 and LN2 may be the same, and refractive powers of at least two of the positive lenses LP1, LP2, and LP3 may be the same.

As shown in FIG. 18, the conditional expression (1) sets a range of a slope of a straight line passing through the point N and the point P.

When the conditional expression (1) is satisfied, axial chromatic aberration in a wavelength range of the near-infrared light can be sufficiently corrected especially at the wide angle end, and good optical performance can be achieved.

When the ratio of the difference between the average partial dispersion ratios to the difference between the average Abbe numbers for the negative lenses and the positive lenses included in the third lens unit L3 exceeds the upper limit value of the conditional expression (1) to become much larger in a positive direction, axial chromatic aberration of the near-infrared light is disadvantageously undercorrected with respect to the visible light especially at the wide angle end.

In contrast, when the ratio of the difference between the average partial dispersion ratios to the difference between the average Abbe numbers for the negative lenses and the positive lenses included in the third lens unit L3 falls below the lower limit value of the conditional expression (1) to become much smaller in a negative direction, axial chromatic aberration of the near-infrared light is disadvantageously overcorrected with respect to the visible light especially at the wide angle end.

In the conditional expression (2), the average Abbe number of the materials of the two negative lenses LN1 and LN2 having the highest refractive powers of the negative lenses included in the third lens unit L3 is defined.

When the conditional expression (2) is satisfied, axial chromatic aberration generated especially at the wide angle end can be sufficiently reduced, and the good optical performance can be obtained.

When the average Abbe number falls below the lower limit value of the conditional expression (2) to become much smaller, a large amount of axial chromatic aberration is disadvantageously generated at the wide angle end in particular.

In each Example of the present invention described below, each element is appropriately set so as to satisfy the above-mentioned conditional expressions (1) and (2).

As a result, it is possible to provide the zoom lens with which chromatic aberration is well corrected in the wavelength range of from the visible light to the near-infrared light while the zoom lens is compact and has the high zoom ratio.

It is preferred that, in the zoom lens according to each Example of the present invention, the numerical ranges of the conditional expressions (1) and (2) be set as in the following conditional expressions (1a) and (2a), respectively.

$$-0.0020 \leq (\theta Ctn_{ave} - \theta Ctp_{ave})/(vdn_{ave} - vdp_{ave})$$

$$\leq 0.0030 \quad (1a)$$

$$35.0 \leq vdn_{ave} \leq 65.0 \quad (2a)$$

It is more preferred that, in the zoom lens according to each Example of the present invention, the numerical ranges of the conditional expressions (1a) and (2a) be set as in the following conditional expressions (1b) and (2b), respectively.

$$-0.0010 \leq (\theta Ctn_{ave} - \theta Ctp_{ave})/(vdn_{ave} - vdp_{ave})$$

$$\leq 0.0025 \quad (1b)$$

$$38.0 \leq vdn_{ave} \leq 62.0 \quad (2b)$$

It is further preferred that the zoom lens according to the present invention satisfy one or more of the following conditional expressions (3) to (8).

$$1.1 \leq f3/fw \leq 8.2 \quad (3)$$

$$7.7 \leq f1/fw \leq 20.0 \quad (4)$$

$$5.0 \leq ft/fw \leq 90.0 \quad (5)$$

$$-12.0 \leq f1/f2 \leq -2.0 \quad (6)$$

$$0.3 \leq BF/fw \leq 3.0 \quad (7)$$

$$0.3 < TD/ft < 2.0 \quad (8)$$

In the expressions, f3 represents a focal length of the third lens unit L3, fw represents a focal length of the entire system at the wide angle end, f1 represents a focal length of the first lens unit L1, and ft represents a focal length of the entire system at a telephoto end. Further, f2 represents a focal length of the second lens unit L2, BF represents a back focus (air-equivalent length of a distance from the last lens surface to a paraxial image plane), and TD represents an entire optical length (length from a surface closest to the object side to an image plane).

In the conditional expression (3), a ratio of the focal length of the third lens unit L3 to the focal length of the entire system at the wide angle end is defined.

When the ratio exceeds the upper limit value of the conditional expression (3), and the refractive power of the third lens unit L3 becomes weaker, the refractive power of the rear lens group LR becomes excessively stronger, and coma at the wide angle end becomes disadvantageously worse.

In contrast, when the ratio falls below the lower limit value of the conditional expression (3), and the refractive power of the third lens unit L3 becomes stronger, spherical aberration at the wide angle end becomes disadvantageously worse.

In the conditional expression (4), a ratio of the focal length of the first lens unit L1 to the focal length of the entire system at the wide angle end is defined.

When the ratio exceeds the upper limit value of the conditional expression (4), and the refractive power of the first lens unit L1 becomes weaker, it is required to excessively strengthen the refractive power of the second lens unit L2 in order to achieve the high zoom ratio, and field curvature at the wide angle end becomes disadvantageously worse.

In contrast, when the ratio falls below the lower limit value of the conditional expression (4), and the refractive power of the first lens unit L1 becomes stronger, spherical aberration at the telephoto end becomes disadvantageously worse.

In the conditional expression (5), a ratio between the focal length of the entire system at the wide angle end and the focal length of the entire system at the telephoto end is defined.

When the ratio exceeds the upper limit value of the conditional expression (5), the refractive power of each lens unit becomes excessively stronger, and various aberrations such as spherical aberration and coma become disadvantageously worse.

In contrast, when the ratio falls below the lower limit value of the conditional expression (5), it becomes difficult to achieve the high zoom ratio.

In the conditional expression (6), a ratio between the focal lengths of the first lens unit L1 and the second lens unit L2 is defined.

When the ratio exceeds the upper limit value of the conditional expression (6), and the refractive power of the second lens unit L2 becomes weaker with respect to the refractive power of the first lens unit L1, a sufficient magnification-varying ratio cannot be ensured as an optical system, and it becomes difficult to achieve the high zoom ratio.

In contrast, when the ratio falls below the lower limit value of the conditional expression (6), and the refractive power of the second lens unit L2 becomes stronger with respect to the refractive power of the first lens unit L1, field curvature at the wide angle end becomes disadvantageously worse.

In the conditional expression (7), a ratio of the back focus to the focal length of the entire system at the wide angle end is defined.

When the ratio exceeds the upper limit value of the conditional expression (7), and the back focus becomes longer, the entire system is disadvantageously upsized. In contrast, when the ratio falls below the lower limit value of the conditional expression (7), and the back focus becomes shorter, a space for arranging an optical element, for example, a low-pass filter or an infrared cut filter, becomes disadvantageously insufficient.

In the conditional expression (8), a ratio of the total lens length to the focal length of the entire system at the telephoto end is defined.

When the ratio exceeds the upper limit value of the conditional expression (8), and the total lens length becomes longer, the entire system is disadvantageously upsized. In contrast, when the ratio falls below the lower limit value of the conditional expression (8), and the total lens length becomes shorter, the refractive power of each lens unit becomes excessively stronger, and various aberrations such as spherical aberration and coma become disadvantageously worse.

It is preferred that, in the zoom lens according to each Example of the present invention, the numerical ranges of the conditional expressions (3) to (8) be set as in the following conditional expressions (3a) to (8a), respectively.

$$1.7 \leq f3/fw \leq 7.5 \quad (3a)$$

$$9.2 \leq f1/fw \leq 16.0 \quad (4a)$$

$$10.0 \leq ft/fw \leq 70.0 \quad (5a)$$

$$-9.0 \leq f1/f2 \leq -4.0 \quad (6a)$$

$$0.7 \leq BF/fw \leq 2.0 \quad (7a)$$

$$0.5 \leq TD/ft \leq 1.5 \quad (8a)$$

It is further preferred that, in the zoom lens according to each Example of the present invention, the numerical ranges of the conditional expressions (3a) to (8a) be set as in the following conditional expressions (3b) to (8b), respectively.

$$2.2 \leq f3/fw \leq 6.7 \quad (3b)$$

$$10.0 \leq f1/fw \leq 15.0 \quad (4b)$$

$$13.0 \leq ft/fw \leq 55.0 \quad (5b)$$

$$-7.5 \leq f1/f2 \leq -4.4 \quad (6b)$$

$$0.8 \leq BF/fw \leq 1.5 \quad (7b)$$

$$0.7 \leq TD/ft \leq 1.4 \quad (8b)$$

In each Example described below, with the above-mentioned configuration of each element, it is possible to provide the zoom lens with which chromatic aberration in the wavelength range of from the visible light to the near-infrared light is well corrected while the zoom lens is compact and has the high zoom ratio.

Further, through any combination of a plurality of the above-mentioned conditional expressions, the effects of the present invention can be further increased.

Next, the zoom lens according to the present invention and an image pickup apparatus including the same are described with reference to the drawings.

The zoom lens according to each Example is an image pickup optical system for use in an image pickup apparatus, for example, a digital still camera, a video camera, a silver halide film camera, or a television camera.

In the lens cross-sectional views of FIG. 1, FIG. 3, FIG. 5, FIG. 7, FIG. 9, FIG. 11, FIG. 13, and FIG. 15, the left side is the object side, and the right side is the image side. The zoom lens includes a first lens unit L1 having a positive refractive power, a second lens unit L2 having a negative refractive power, a third lens unit L3 having a positive refractive power, a fourth lens unit L4 having a negative refractive power, and a fifth lens unit L5 having a positive refractive power. Therefore, the rear lens group LR includes the fourth lens unit L4 and the fifth lens unit L5.

The zoom lens further includes an optical block P corresponding to an optical filter, a face plate, a low-pass filter, an infrared cut filter or the like. An image plane is represented by I. When the zoom lens is used as an image pickup optical system of a digital still camera or a video camera, the image plane I corresponds to a solid state image pickup element (photoelectric conversion element), for example, a CCD sensor or a CMOS sensor. Alternatively, when the zoom lens is used as an image pickup optical system of a silver halide film camera, the image plane I corresponds to a film surface.

The arrows in the lens cross-sectional views indicate movement loci of the lens units during zooming.

In each Example, an aperture stop SP is arranged on the object side with respect to the third lens unit L3. An aperture diameter of the aperture stop SP may be constant or changed during zooming. When the aperture diameter of the aperture stop SP is changed, lower ray coma flare, which is greatly caused by an off-axial ray at the telephoto end, can be cut, and thus better optical performance can be obtained.

Focusing is performed by moving the fourth lens unit L4 on the optical axis. Of the movement loci for the fourth lens unit L4 drawn in the lens cross-sectional views, the solid-line curve indicates a movement locus for correcting an image plane variation accompanying zooming from the wide angle end to the telephoto end when the zoom lens is focused on an object at infinity. Similarly, the dotted-line curve indicates a movement locus for correcting an image plane variation accompanying zooming from the wide angle end to the telephoto end when the zoom lens is focused on an object at a close distance.

In each Example, focusing may be performed by moving not the fourth lens unit L4 but the fifth lens unit L5 on the optical axis.

In the spherical aberration diagrams, an f-number is represented by Fno. Further, the solid line indicates the d-line (wavelength: 587.56 nm), the two-dot chain line indicates a g-line (wavelength: 435.84 nm), the one-dot chain line indicates the C-line (wavelength: 656.27 nm), the broken line indicates the F-line (wavelength: 486.13 nm), and the dotted line indicates a wavelength of 850 nm.

In the astigmatism diagrams, the solid line indicates a sagittal image plane with respect to the d-line, and the dotted line indicates a meridional image plane with respect to the d-line. Distortion is shown with respect to the d-line. In the lateral chromatic aberration diagrams, aberrations of the g-line, the C-line, the F-line, and the wavelength of 850 nm with respect to the d-line are shown. An image pickup half angle of view is represented by w.

Next, a lens configuration in each Example is described. The lenses are arranged in order from the object side to the image side unless otherwise specified.

EXAMPLE 1

The first lens unit L1 consists of a lens formed by cementing a meniscus negative lens having a convex surface on the object side and a biconvex positive lens, a biconvex positive lens, and a meniscus positive lens having a convex surface on the object side. Through the arrangement of the cemented lens, axial chromatic aberration can be well corrected especially at the telephoto end.

The second lens unit L2 consists of a meniscus negative lens having a convex surface on the object side, a biconcave negative lens, a biconcave negative lens, and a biconvex positive lens. With this lens configuration, field curvature at the wide angle end, and lateral chromatic aberration over the entire zoom range are effectively corrected.

The third lens unit L3 consists of a meniscus positive lens having a convex surface on the object side, a meniscus positive lens having a convex surface on the object side, both surfaces of which are aspherical, a biconcave negative lens, a lens formed by cementing a meniscus negative lens having a convex surface on the object side and a biconvex positive lens, and a biconvex positive lens. With this configuration, generation of spherical aberration at the wide angle end can be suppressed.

The fourth lens unit L4 consists of a lens formed by cementing a meniscus positive lens having a concave surface on the object side and a biconcave negative lens. With the fourth lens unit L4 consisting of one cemented lens, a variation in a lateral chromatic aberration during focusing can be suppressed, and the weight is reduced to facilitate control during focusing.

The fifth lens unit L5 consists of a lens formed by cementing a meniscus negative lens having a convex surface on the object side and a biconvex positive lens. With the fifth lens unit L5 as the last lens unit being a lens unit having a positive refractive power, telecentricity is increased, and an off-axial light flux is incident on an image pickup element at an angle close to the perpendicular. Therefore, a reduction in light amount around the image plane due to shading can be suppressed.

EXAMPLE 2

The first lens unit L1 consists of a lens formed by cementing a meniscus negative lens having a convex surface on the object side and a biconvex positive lens, a lens formed by cementing a meniscus negative lens having a convex surface on the object side and a biconvex positive lens, and a meniscus positive lens having a convex surface on the object side. Through the arrangement of two cemented lenses, axial chromatic aberration can be well corrected especially at the telephoto end.

The second lens unit L2 has a configuration similar to that in Example 1.

The third lens unit L3 consists of a meniscus positive lens having a convex surface on the object side, a biconvex positive lens, both surfaces of which are aspherical, a biconcave negative lens, a lens formed by cementing a meniscus negative lens having a convex surface on the object side and a biconvex positive lens, and a biconvex positive lens. With this configuration, generation of spherical aberration at the wide angle end can be suppressed.

The fourth lens unit L4 and the fifth lens unit L5 have configurations similar to those in Example 1.

EXAMPLE 3

The first lens unit L1 consists of a meniscus negative lens having a convex surface on the object side, a lens formed by cementing a meniscus negative lens having a convex surface on the object side and a biconvex positive lens, a biconvex positive lens, and a biconvex positive lens. Through the arrangement of the cemented lens, axial chromatic aberration can be well corrected especially at the telephoto end.

The second lens unit L2 has a configuration similar to that in Example 1.

The third lens unit L3 consists of a meniscus positive lens having a convex surface on the object side, a biconvex positive lens, both surfaces of which are aspherical, a biconcave negative lens, a lens formed by cementing a meniscus negative lens having a convex surface on the object side and a biconvex positive lens, and a meniscus positive lens having a convex surface on the object side. With this configuration, generation of spherical aberration at the wide angle end can be suppressed.

The fourth lens unit L4 has a configuration similar to that in Example 1.

The fifth lens unit L5 consists of a biconvex positive lens. With the fifth lens unit L5 as the last lens unit being a lens unit having a positive refractive power, telecentricity is increased, and an off-axial light flux is incident on the image pickup element at an angle close to the perpendicular. Therefore, the reduction in light amount around the image plane due to shading can be suppressed.

EXAMPLE 4

The first lens unit L1 has a configuration similar to that in Example 1.

The second lens unit L2 consists of a meniscus negative lens having a convex surface on the object side, a biconcave negative lens, a meniscus negative lens having a concave surface on the object side, and a biconvex positive lens. With this configuration, field curvature at the wide angle end, and lateral chromatic aberration over the entire zoom range are effectively corrected.

The third lens unit L3 has a configuration similar to that in Example 2.

The fourth lens unit L4 consists of a lens formed by cementing a biconvex positive lens and a biconcave negative lens. With the fourth lens unit L4 consisting of one cemented lens, a variation in lateral chromatic aberration during focusing can be suppressed, and the weight is reduced to facilitate control during focusing.

The fifth lens unit L5 has a configuration similar to that in Example 1.

EXAMPLE 5

The first lens unit L1 has a configuration similar to that in Example 1.

The second lens unit L2 has a configuration similar to that in Example 4.

The third lens unit L3 has a configuration similar to that in Example 2.

The fourth lens unit L4 has a configuration similar to that in Example 4.

The fifth lens unit L5 has a configuration similar to that in Example 1.

EXAMPLE 6

The first lens unit L1 has a configuration similar to that in Example 1.

The second lens unit L2 consists of a meniscus negative lens having a convex surface on the object side, a meniscus negative lens having a convex surface on the object side, a meniscus negative lens having a concave surface on the object side, and a biconvex positive lens. With this lens configuration, field curvature at the wide angle end, and lateral chromatic aberration over the entire zoom range are effectively corrected.

The third lens unit L3 has a configuration similar to that in Example 2.

The fourth lens unit L4 and the fifth lens unit L5 have configurations similar to those in Example 1.

EXAMPLE 7

The first lens unit L1 has a configuration similar to that in Example 1.

The second lens unit L2 consists of a meniscus negative lens having a convex surface on the object side, a meniscus negative lens having a convex surface on the object side, a biconcave negative lens, and a meniscus positive lens having a convex surface on the object side. With this lens configuration, field curvature at the wide angle end, and lateral chromatic aberration over the entire zoom range are effectively corrected.

The third lens unit L3 consists of a meniscus positive lens having a convex surface on the object side, a meniscus positive lens having a convex surface on the object side, both surfaces of which are aspherical, a biconcave negative lens, a lens formed by cementing a meniscus negative lens having a convex surface on the object side and a biconvex positive lens, and a meniscus positive lens having a convex surface on the object side. With this configuration, generation of spherical aberration at the wide angle end can be suppressed.

The fourth lens unit L4 has a configuration similar to that in Example 4.

The fifth lens unit L5 has a configuration similar to that in Example 1.

EXAMPLE 8

The first lens unit L1 has a configuration similar to that in Example 2.

The second lens unit L2 has a configuration similar to that in Example 1.

The third lens unit L3 consists of a meniscus positive lens having a convex surface on the object side, a meniscus positive lens having a convex surface on the object side, both surfaces of which is aspherical, a lens formed by cementing a biconcave negative lens and a biconvex positive lens, and a lens formed by cementing a biconvex positive lens and a meniscus negative lens having a concave surface on the object side. With this configuration, generation of spherical aberration at the wide angle end can be suppressed.

The fourth lens unit L4 has a configuration similar to that in Example 4.

The fifth lens unit L5 consists of a lens formed by cementing a biconvex positive lens and a meniscus negative lens having a concave surface on the object side. With the fifth lens unit L5 as the last lens unit being a lens unit having a positive refractive power, telecentricity is increased, and an off-axial light flux is incident on an image pickup element at an angle close to the perpendicular. Therefore, a reduction in light amount around the image plane due to shading can be suppressed.

In the above description, Examples in which the rear lens group LR includes two lens units of the fourth lens unit L4 and the fifth lens unit L5 have been described, but the present invention is not limited thereto.

The effects of the present invention can be also obtained when the rear lens group LR includes at least one lens unit, that is, one lens unit, or three or more lens units.

Next, an Example of an image pickup apparatus in which the zoom lens according to the present invention is used as the image pickup optical system is described with reference to FIG. 17.

Figure 17:
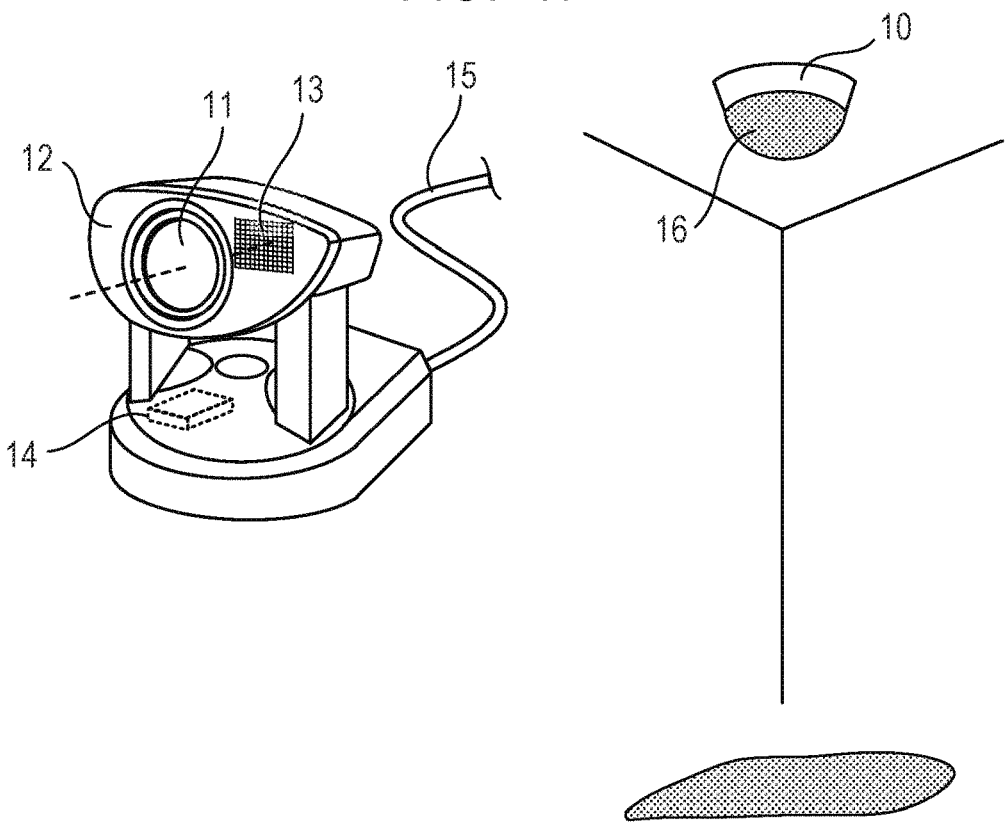
FIG. 17 is a schematic perspective view of an image pickup apparatus including a zoom lens according to the present invention.

In FIG. 17, the image pickup apparatus includes a monitoring camera main body 10, and the zoom lens 11 according to any one of Examples 1 to 8 described above, which serves as an image pickup optical system.

An image pickup apparatus 12 includes the zoom lens 11, and a solid state image pickup element (photoelectric conversion element) 13, for example, a CCD sensor or a CMOS sensor, which is configured to receive light of an object image formed by the image pickup apparatus 12.

There is further illustrated a memory 14 configured to store information corresponding to an object image subjected to photoelectric conversion by the solid-state image pickup element 13, and a network cable 15 for transmitting the object image subjected to photoelectric conversion by the solid-state image pickup element 13.

A dome cover 16 is configured to protect the monitoring camera main body 10.

The zoom lens according to the present invention is not limited for use in a monitoring camera as the image pickup apparatus, but may also be used in a video camera or a digital camera, for example.

The image pickup apparatus according to the present invention may include, in addition to the zoom lens according to any one of Examples 1 to 8 described above, a circuit configured to electrically correct at least one of distortion and lateral chromatic aberration.

With the configuration including the above-mentioned circuit, which allows distortion of the zoom lens, the number and effective diameters of lenses of the zoom lens can be reduced, which is advantageous in downsizing.

Further, through the provision of the above-mentioned circuit to electrically correct lateral chromatic aberration, color bleeding of the taken image can be reduced to increase a resolution of the taken image with ease.

There may be configured an image pickup system (monitoring camera system) including the zoom lens of each Example and a controller configured to control the zoom lens. In this case, the controller may control the zoom lens so that each lens unit is moved as described above for zooming. At this time, the controller is not required to be formed integrally with the zoom lens, and the controller may be formed separately from the zoom lens. For example, there may be employed a configuration in which a controller arranged distant from a driving unit configured to drive each lens of the zoom lens includes a transmitter configured to transmit a control signal (command) for controlling the zoom lens. With such a controller, the zoom lens can be operated remotely.

Further, there may be a configuration in which the controller includes an operating device, for example, a controller portion and buttons, for remotely operating the zoom lens so that the zoom lens is controlled in accordance with user's input to the operating device. For example, as the operating device, a zoom-in button and a zoom-out button may be provided so that the magnification of the zoom lens may be increased when the user depresses the zoom-in button, and the magnification of the zoom lens may be decreased when the user depresses the zoom-out button. The controller may be configured to transmit signals indicating such instructions to the driving unit of the zoom lens.

Further, the image pickup system may include a display, for example, a liquid crystal panel, configured to display information (moving state) on the zooming of the zoom lens. Examples of the information on the zooming of the zoom lens include a zoom magnification (zoom state) and an moving amount (moving state) of each lens unit. In this case, the user can remotely operate the zoom lens via the operating device while viewing the information on zooming of the zoom lens displayed on the display. At this time, for example, a touch panel may be employed so that the display and the operating device may be integrated.

The exemplary embodiments of the present invention are described above, but the present invention is not limited to those embodiments and can be modified and changed variously within the scope of the gist thereof.

For example, the cemented lens may be divided to provide an air interval between lenses, or a spherical lens may be changed to an aspherical lens to further correct aberrations.

Next, Numerical Examples 1 to 8 corresponding to Examples 1 to 8 of the present invention, respectively, are described. In each Numerical Example, the order of an optical surface from the object side is represented by i.

A curvature radius of the i-th optical surface (i-th surface) is represented by ri, and an interval between the i-th surface and the (i+1)th surface is represented by di.

A refractive index, an Abbe number, and a partial dispersion ratio of a material of an optical member between the i-th surface and the (i+1)th surface with respect to the d-line are represented by ndi, vdi, and θCti, respectively.

Further, for a single lens having an optical member between the i-th surface and the (i+1)th surface, a focal length with respect to the d-line is provided.

A BF (back focus) is a distance from the last lens surface to the paraxial image plane expressed in an air-equivalent length. An asterisk (*) means an aspherical surface.

Here, an Abbe number and a partial dispersion ratio of an optical material used in each Example are defined as follows.

Refractive indices with respect to the F-line (486.1 nm), the d-line (587.6 nm), the C-line (656.3 nm), and the t-line (1,013.98 nm) of the Fraunhofer lines are represented by nF, nd, nC, and nt, respectively.

Then, an Abbe number vd and a partial dispersion ratio θCt with respect to the C-line and the t-line are given as the following expressions (A) and (B), respectively:

$$vd=(nd-1)/(nF-nC) \quad (A); \text{ and}$$

$$\theta Ct=(nC-nt)/(nF-nC) \quad (B).$$

Further, when an eccentricity is represented by k, a paraxial curvature radius is represented by R, aspherical coefficients are represented by A4, A6, A8, and A10, and a displacement in the optical axis direction at a position of a height h from the optical axis with reference to a surface vertex is represented by x, an aspherical shape is expressed as:

$$x=(h^2/R)/[1+\{1-(1+k)(h/R)^2\}^{1/2}]+A4h^4+A6h^6+A8h^8+A10h^{10} \quad (C).$$

Still further, the movement locus of the third lens unit L3 in each Example can be expressed by the following expression (D), and the lens arrangement at the above-mentioned zoom intermediate position is described as "intermediate" in Numerical Examples 1 to 8.

$$m3=B1 \cdot m2+B2 \cdot m2^2+B3 \cdot m2^3+B4 \cdot m2^4+B5 \cdot m2^5+B6 \cdot m2^6+B7 \cdot m2^7+B8 \cdot m2^8+B9 \cdot m2^9+B10 \cdot m2^{10} \quad (D)$$

Here, m2 in the expression (D) is a value obtained by normalizing a moving amount of the second lens unit L2 from the wide angle end with a moving amount thereof from the wide angle end to the telephoto end, that is, 0 at the wide angle end, and 1 at the telephoto end. Further, m3 is a moving amount of the third lens unit L3 from the wide angle end. Bn is an n-th order moving amount coefficient.

Correspondences of Numerical Examples 1 to 8 to the above-mentioned conditional expressions (1) to (8) are provided in the following Table 1.

TABLE 1

| Conditional Expression | Numerical Example | | | | | | | |
|---|---|---|---|---|---|---|---|---|
| | 1 | 2 | 3 | 4 | 5 | 6 | 7 | 8 |
| (1) | 0.0020 | 0.0013 | 0.0019 | 0.0017 | 0.0015 | 0.0017 | −0.0008 | 0.0017 |
| (2) | 40.0 | 48.1 | 42.7 | 44.6 | 46.2 | 44.6 | 60.1 | 44.6 |
| (3) | 4.86 | 4.48 | 3.97 | 6.58 | 3.68 | 2.31 | 5.35 | 4.00 |
| (4) | 13.09 | 12.62 | 14.52 | 14.58 | 10.54 | 10.22 | 13.55 | 14.06 |
| (5) | 39.52 | 39.48 | 39.48 | 26.41 | 29.48 | 14.49 | 49.47 | 39.11 |
| (6) | −6.44 | −6.47 | −6.25 | −7.44 | −5.62 | −4.48 | −6.06 | −6.98 |
| (7) | 1.31 | 1.24 | 1.28 | 1.26 | 1.19 | 0.78 | 1.13 | 1.20 |
| (8) | 0.77 | 0.75 | 0.78 | 1.29 | 0.78 | 1.27 | 0.72 | 0.74 |

NUMERICAL EXAMPLE 1

| Unit: mm | | | | | | |
|---|---|---|---|---|---|---|
| Surface data | | | | | | |
| Surface number | r | d | nd | vd | θct | Focal length |
| 1 | 325.716 | 1.60 | 1.83481 | 42.7 | 0.7533 | −54.34 |
| 2 | 39.730 | 7.36 | 1.49700 | 81.5 | 0.8258 | 67.06 |
| 3 | −194.129 | 0.15 | | | | |

-continued

| Unit: mm | | | | | | |
|---|---|---|---|---|---|---|
| 4 | 43.649 | 5.18 | 1.49700 | 81.5 | 0.8258 | 81.90 |
| 5 | −579.228 | 0.10 | | | | |
| 6 | 42.023 | 3.56 | 1.49700 | 81.5 | 0.8258 | 112.58 |
| 7 | 164.028 | (Variable) | | | | |
| 8 | 172.944 | 0.80 | 1.83481 | 42.7 | 0.7533 | −11.24 |
| 9 | 8.884 | 3.62 | | | | |
| 10 | −136.311 | 0.60 | 1.80400 | 46.5 | 0.7716 | −27.83 |
| 11 | 26.823 | 2.02 | | | | |
| 12 | −22.875 | 0.60 | 1.77250 | 49.6 | 0.7955 | −25.86 |
| 13 | 159.645 | 0.09 | | | | |
| 14 | 28.832 | 1.99 | 1.95906 | 17.5 | 0.6264 | 21.28 |
| 15 | −67.514 | (Variable) | | | | |
| 16 (Stop) | ∞ | (Variable) | | | | |
| 17 | 13.319 | 4.49 | 1.49700 | 81.5 | 0.8258 | 33.01 |
| 18 | 62.840 | 3.90 | | | | |
| 19* | 10.496 | 5.12 | 1.49700 | 81.5 | 0.8258 | 21.59 |
| 20* | 399.925 | 0.92 | | | | |
| 21 | −44.767 | 0.70 | 1.83481 | 42.7 | 0.7533 | −10.36 |
| 22 | 10.801 | 0.73 | | | | |
| 23 | 17.475 | 0.60 | 1.83400 | 37.2 | 0.7324 | −38.89 |
| 24 | 11.180 | 3.33 | 1.49700 | 81.5 | 0.8258 | 17.44 |
| 25 | −34.733 | 1.77 | | | | |
| 26 | 12.068 | 2.60 | 1.49700 | 81.5 | 0.8258 | 20.90 |
| 27 | −69.252 | (Variable) | | | | |
| 28 | −2,773.781 | 1.21 | 1.95906 | 17.5 | 0.6264 | 19.81 |
| 29 | −18.877 | 0.40 | 1.90525 | 35.0 | 0.7094 | −7.00 |
| 30 | 9.637 | (Variable) | | | | |
| 31 | 11.446 | 0.60 | 1.84666 | 23.8 | 0.6614 | −23.55 |
| 32 | 7.097 | 4.84 | 1.71999 | 50.2 | 0.7931 | 8.43 |
| 33 | −29.990 | | | | | |

Aspherical surface data

Nineteenth surface

K = −8.76433e−001  A4 = 7.71609e−005  A6 = 4.45837e−007  A8 = 3.45861e−009

Twentieth surface

K = 0.00000e+000  A4 = 1.34956e−004  A6 = −3.45989e−008

Various data
Zoom ratio 39.49

| | Wide angle | Intermediate | Telephoto |
|---|---|---|---|
| Focal length | 4.20 | 42.74 | 166.00 |
| F-number | 1.65 | 3.00 | 4.94 |
| Half angle of view | 37.28 | 4.28 | 1.10 |
| Image height | 3.20 | 3.20 | 3.20 |
| Total lens length | 127.19 | 127.19 | 127.19 |
| BF | 5.49 | 5.49 | 5.49 |
| d7 | 0.60 | 33.23 | 40.40 |
| d15 | 41.29 | 8.66 | 1.49 |
| d16 | 16.33 | 7.24 | 1.40 |
| d27 | 2.50 | 9.57 | 5.36 |
| d30 | 2.10 | 4.11 | 14.17 |

Zoom lens unit data

| Unit | First surface | Focal length |
|---|---|---|
| 1 | 1 | 54.98 |
| 2 | 8 | −8.54 |
| 3 | ∞ | ∞ |
| 4 | 17 | 20.42 |
| 5 | 28 | −10.94 |
| 6 | 31 | 13.13 |

Zoom locus data

B1 = −5.86789e+001   B2 = 6.74961e+002   B3 = −6.12739e+003
B4 = 3.09355e+004    B5 = −9.12769e+004  B6 = 1.62348e+005
B7 = −1.72581e+005   B8 = 1.03236e+005   B9 = −2.93314e+004
B10 = 2.16600e+003

NUMERICAL EXAMPLE 2

| Unit: mm | | | | | |
|---|---|---|---|---|---|
| Surface data | | | | | |

| Surface number | r | d | nd | vd | θct | Focal length |
|---|---|---|---|---|---|---|
| 1 | 278.746 | 1.55 | 1.80400 | 46.5 | 0.7716 | −59.02 |
| 2 | 40.451 | 6.97 | 1.49700 | 81.5 | 0.8258 | 70.05 |
| 3 | −235.578 | 0.15 | | | | |
| 4 | 66.244 | 1.31 | 1.69680 | 55.5 | 0.8330 | −161.18 |
| 5 | 41.330 | 5.24 | 1.49700 | 81.5 | 0.8258 | 79.07 |
| 6 | −765.109 | 0.10 | | | | |
| 7 | 34.458 | 5.78 | 1.49700 | 81.5 | 0.8258 | 70.38 |
| 8 | 2,176.812 | (Variable) | | | | |
| 9 | 650.036 | 0.80 | 1.80400 | 46.5 | 0.7716 | −10.61 |
| 10 | 8.417 | 3.24 | | | | |
| 11 | −80.003 | 0.60 | 1.77250 | 49.6 | 0.7955 | −20.98 |
| 12 | 20.386 | 2.20 | | | | |
| 13 | −17.034 | 0.60 | 1.69680 | 55.5 | 0.8330 | −21.65 |
| 14 | 133.598 | 0.09 | | | | |
| 15 | 28.891 | 2.64 | 1.85478 | 24.8 | 0.6739 | 16.60 |
| 16 | −26.717 | (Variable) | | | | |
| 17 (Stop) | ∞ | (Variable) | | | | |
| 18 | 12.854 | 4.90 | 1.49700 | 81.5 | 0.8258 | 40.59 |
| 19 | 30.948 | 1.12 | | | | |
| 20* | 11.300 | 6.36 | 1.49700 | 81.5 | 0.8258 | 17.10 |
| 21* | −27.899 | 0.99 | | | | |
| 22 | −25.209 | 0.70 | 1.80400 | 46.5 | 0.7716 | −10.75 |
| 23 | 13.309 | 0.69 | | | | |
| 24 | 23.460 | 0.60 | 1.77250 | 49.6 | 0.7955 | −14.83 |
| 25 | 7.612 | 4.55 | 1.49700 | 81.5 | 0.8258 | 13.00 |
| 26 | −34.298 | 0.15 | | | | |
| 27 | 11.551 | 4.04 | 1.49700 | 81.5 | 0.8258 | 17.30 |
| 28 | −29.708 | (Variable) | | | | |
| 29 | −1,055.074 | 2.50 | 1.95906 | 17.5 | 0.6264 | 16.22 |
| 30 | −15.343 | 0.40 | 1.90525 | 35.0 | 0.7094 | −6.12 |
| 31 | 8.769 | (Variable) | | | | |
| 32 | 10.982 | 0.50 | 1.84666 | 23.8 | 0.6614 | −24.02 |
| 33 | 6.982 | 4.32 | 1.63854 | 55.4 | 0.7968 | 8.67 |
| 34 | −20.298 | | | | | |

Aspherical surface data

Twentieth surface

K = −8.38297e−001   A4 = 4.15595e−005   A6 = 3.35700e−007   A8 = 8.80528e−010
A10 = 1.96715e−011

Twenty-first surface

K = −3.69828e+000   A4 = 1.28809e−004   A6 = −5.21399e−007   A8 = −1.63897e−009

Various data
Zoom ratio 39.49

| | Wide angle | Intermediate | Telephoto |
|---|---|---|---|
| Focal length | 4.36 | 42.74 | 172.12 |
| F-number | 1.65 | 3.00 | 4.94 |
| Half angle of view | 36.28 | 4.28 | 1.07 |
| Image height | 3.20 | 3.20 | 3.20 |
| Total lens length | 129.41 | 129.41 | 129.41 |
| BF | 5.40 | 5.40 | 5.40 |
| d8 | 0.56 | 33.20 | 40.36 |
| d16 | 41.60 | 8.96 | 1.80 |
| d17 | 14.18 | 6.64 | 1.40 |
| d28 | 2.50 | 8.16 | 3.81 |
| d31 | 2.10 | 3.98 | 13.57 |

Zoom lens unit data

| Unit | First surface | Focal length |
|---|---|---|
| 1 | 1 | 55.02 |
| 2 | 9 | −8.51 |
| 3 | 17 | ∞ |
| 4 | 18 | 19.54 |
| 5 | 29 | −9.93 |
| 6 | 32 | 13.38 |

-continued

| Unit: mm |
| --- |
| Zoom locus data |

| | | |
|---|---|---|
| B1 = −4.24728e+001 | B2 = 3.78036e+002 | B3 = −3.64319e+003 |
| B4 = 1.80761e+004 | B5 = −4.49209e+004 | B6 = 4.97756e+004 |
| B7 = 7.08132e+002 | B8 = −5.60006e+004 | B9 = 4.97472e+004 |
| B10 = −1.40906e+004 | | |

NUMERICAL EXAMPLE 3

| Unit: mm |
| --- |
| Surface data |

| Surface number | r | d | nd | vd | θct | Focal length |
|---|---|---|---|---|---|---|
| 1 | 138.493 | 1.50 | 1.77250 | 49.6 | 0.7955 | −169.36 |
| 2 | 66.960 | 2.60 | | | | |
| 3 | 148.350 | 1.60 | 1.77250 | 49.6 | 0.7955 | −59.08 |
| 4 | 34.736 | 8.63 | 1.49700 | 81.5 | 0.8258 | 63.40 |
| 5 | −311.495 | 0.15 | | | | |
| 6 | 45.306 | 5.61 | 1.49700 | 81.5 | 0.8258 | 89.44 |
| 7 | −2,267.302 | 0.10 | | | | |
| 8 | 51.929 | 4.76 | 1.49700 | 81.5 | 0.8258 | 91.05 |
| 9 | −341.108 | (Variable) | | | | |
| 10 | 377.256 | 0.80 | 1.77250 | 49.6 | 0.7955 | −12.16 |
| 11 | 9.158 | 3.88 | | | | |
| 12 | −79.308 | 0.60 | 1.77250 | 49.6 | 0.7955 | −28.92 |
| 13 | 31.205 | 2.30 | | | | |
| 14 | −18.860 | 0.60 | 1.69680 | 55.5 | 0.8330 | −22.70 |
| 15 | 99.424 | 0.15 | | | | |
| 16 | 34.807 | 2.81 | 1.85478 | 24.8 | 0.6739 | 19.28 |
| 17 | −30.128 | (Variable) | | | | |
| 18 (Stop) | ∞ | (Variable) | | | | |
| 19 | 10.990 | 5.32 | 1.49700 | 81.5 | 0.8258 | 25.96 |
| 20 | 62.301 | 0.10 | | | | |
| 21* | 23.374 | 3.53 | 1.49700 | 81.5 | 0.8258 | 32.25 |
| 22* | −48.421 | 1.88 | | | | |
| 23 | 566.730 | 0.70 | 1.83481 | 42.7 | 0.7533 | −13.77 |
| 24 | 11.262 | 0.49 | | | | |
| 25 | 14.183 | 0.60 | 1.83481 | 42.7 | 0.7533 | −22.67 |
| 26 | 7.951 | 4.65 | 1.49700 | 81.5 | 0.8258 | 12.84 |
| 27 | −26.065 | 0.14 | | | | |
| 28 | 9.361 | 2.32 | 1.49700 | 81.5 | 0.8258 | 22.94 |
| 29 | 48.003 | (Variable) | | | | |
| 30 | −569.264 | 0.78 | 1.95906 | 17.5 | 0.6264 | 25.76 |
| 31 | −23.698 | 0.40 | 1.91082 | 35.3 | 0.7128 | −6.13 |
| 32 | 7.369 | (Variable) | | | | |
| 33 | 10.978 | 2.89 | 1.49700 | 81.5 | 0.8258 | 13.23 |
| 34 | −14.977 | | | | | |

| Aspherical surface data |
| --- |
| Nineteenth surface |

K = −9.98413e−001  A4 = 5.10413e−005  A6 = 1.58229e−007  A8 = 8.61470e−010

Twentieth surface

K = 0.00000e+000  A4 = 6.03316e−005  A6 = 1.20789e−007

| Various data |
| --- |
| Zoom ratio 39.49 |

| | Wide angle | Intermediate | Telephoto |
|---|---|---|---|
| Focal length | 4.21 | 44.96 | 166.22 |
| F-number | 1.65 | 3.00 | 4.94 |
| Half angle of view | 37.24 | 4.07 | 1.10 |
| Image height | 3.20 | 3.20 | 3.20 |
| Total lens length | 129.42 | 129.42 | 129.42 |
| BF | 5.38 | 5.38 | 5.38 |
| d9 | 0.59 | 40.47 | 49.23 |
| d17 | 50.42 | 10.53 | 1.78 |
| d18 | 7.71 | 2.67 | 1.38 |

| Unit: mm | | | |
|---|---|---|---|
| d29 | 3.39 | 7.80 | 2.48 |
| d32 | 2.05 | 2.69 | 9.29 |

| Zoom lens unit data | | |
|---|---|---|
| Unit | First surface | Focal length |
| 1 | 1 | 61.13 |
| 2 | 10 | −9.78 |
| 3 | 18 | ∞ |
| 4 | 19 | 16.70 |
| 5 | 30 | −8.11 |
| 6 | 33 | 13.23 |

| Zoom locus data | | |
|---|---|---|
| B1 = −3.03360e+001 | B2 = 4.13514e+002 | B3 = −4.68698e+003 |
| B4 = 2.62698e+004 | B5 = −8.06248e+004 | B6 = 1.45345e+005 |
| B7 = −1.58052e+005 | B8 = 1.02170e+005 | B9 = −3.63328e+004 |
| B10 = 5.52239e+003 | | |

NUMERICAL EXAMPLE 4

| Unit: mm | | | | | |
|---|---|---|---|---|---|
| Surface data | | | | | |
| Surface number | r | d | nd | vd | θct | Focal length |
| 1 | 424.243 | 1.60 | 1.83481 | 42.7 | 0.7533 | −56.71 |
| 2 | 42.516 | 7.10 | 1.49700 | 81.5 | 0.8258 | 70.11 |
| 3 | −182.391 | 0.15 | | | | |
| 4 | 52.351 | 4.32 | 1.49700 | 81.5 | 0.8258 | 99.36 |
| 5 | −846.871 | 0.10 | | | | |
| 6 | 41.596 | 4.21 | 1.49700 | 81.5 | 0.8258 | 92.47 |
| 7 | 423.668 | (Variable) | | | | |
| 8 | 3,297.222 | 0.80 | 1.83481 | 42.7 | 0.7533 | −10.28 |
| 9 | 8.561 | 3.13 | | | | |
| 10 | −217.350 | 0.60 | 1.80400 | 46.5 | 0.7716 | −22.03 |
| 11 | 19.307 | 2.09 | | | | |
| 12 | −20.635 | 0.60 | 1.77250 | 49.6 | 0.7955 | −28.21 |
| 13 | −394.183 | 0.61 | | | | |
| 14 | 27.108 | 1.71 | 1.95906 | 17.5 | 0.6264 | 23.22 |
| 15 | −120.993 | (Variable) | | | | |
| 16 (Stop) | ∞ | (Variable) | | | | |
| 17 | 13.593 | 4.84 | 1.49700 | 81.5 | 0.8258 | 34.12 |
| 18 | 60.413 | 4.79 | | | | |
| 19* | 11.131 | 5.11 | 1.49700 | 81.5 | 0.8258 | 19.98 |
| 20* | −77.966 | 1.30 | | | | |
| 21 | −27.087 | 0.70 | 1.83481 | 42.7 | 0.7533 | −10.34 |
| 22 | 12.820 | 0.58 | | | | |
| 23 | 19.758 | 0.60 | 1.80400 | 46.5 | 0.7716 | −22.30 |
| 24 | 9.271 | 4.60 | 1.49700 | 81.5 | 0.8258 | 13.95 |
| 25 | −22.940 | 4.65 | | | | |
| 26 | 20.225 | 3.45 | 1.49700 | 81.5 | 0.8258 | 19.28 |
| 27 | −17.173 | (Variable) | | | | |
| 28 | 76.447 | 0.97 | 1.95906 | 17.5 | 0.6264 | 32.70 |
| 29 | −52.835 | 0.40 | 1.90525 | 35.0 | 0.7094 | −7.61 |
| 30 | 7.945 | (Variable) | | | | |
| 31 | 10.585 | 0.60 | 1.84666 | 23.8 | 0.6614 | −28.95 |
| 32 | 7.201 | 3.92 | 1.71999 | 50.2 | 0.7931 | 8.26 |
| 33 | −26.454 | | | | | |

| Aspherical surface data |
|---|
| Nineteenth surface |

K = −1.09202e+000  A4 = 8.62055e−005  A6 = 5.68802e−007  A8 = 3.66096e−009

Twentieth surface

K = 0.00000e+000  A4 = 1.71421e−004  A6 = 6.36796e−009

Unit: mm

Various data
Zoom ratio 26.43

|  | Wide angle | Intermediate | Telephoto |
|---|---|---|---|
| Focal length | 3.79 | 37.34 | 100.10 |
| F-number | 1.65 | 3.00 | 4.94 |
| Half angle of view | 40.19 | 4.90 | 1.83 |
| Image height | 3.20 | 3.20 | 3.20 |
| Total lens length | 129.45 | 129.45 | 129.45 |
| BF | 4.77 | 4.77 | 4.77 |
| d7 | 0.51 | 33.15 | 40.31 |
| d15 | 41.29 | 8.65 | 1.49 |
| d16 | 14.83 | 1.38 | 1.40 |
| d27 | 2.47 | 13.37 | 12.58 |
| d30 | 2.04 | 4.59 | 5.36 |

Zoom lens unit data

| Unit | First surface | Focal length |
|---|---|---|
| 1 | 1 | 55.27 |
| 2 | 8 | −7.43 |
| 3 | 16 | ∞ |
| 4 | 17 | 24.94 |
| 5 | 28 | −10.07 |
| 6 | 31 | 11.70 |

Zoom locus data

B1 = −7.19201e+001  B2 = 7.70723e+002  B3 = −6.84367e+003
B4 = 3.30970e+004  B5 = −9.17762e+004  B6 = 1.53588e+005
B7 = −1.59873e+005  B8 = 1.04032e+005  B9 = −4.02516e+004
B10 = 7.31473e+003

NUMERICAL EXAMPLE 5

Unit: mm

Surface data

| Surface number | r | d | nd | νd | θct | Focal length |
|---|---|---|---|---|---|---|
| 1 | 247.653 | 1.60 | 1.83481 | 42.7 | 0.7533 | −60.31 |
| 2 | 41.715 | 6.04 | 1.49700 | 81.5 | 0.8258 | 71.37 |
| 3 | −225.580 | 0.15 | | | | |
| 4 | 44.400 | 5.27 | 1.49700 | 81.5 | 0.8258 | 84.22 |
| 5 | −702.290 | 0.10 | | | | |
| 6 | 44.285 | 3.67 | 1.49700 | 81.5 | 0.8258 | 129.75 |
| 7 | 137.490 | (Variable) | | | | |
| 8 | 75.853 | 0.80 | 1.83481 | 42.7 | 0.7533 | −12.60 |
| 9 | 9.195 | 3.42 | | | | |
| 10 | −138.937 | 0.60 | 1.80400 | 46.5 | 0.7716 | −39.16 |
| 11 | 40.794 | 1.77 | | | | |
| 12 | −23.417 | 0.60 | 1.77250 | 49.6 | 0.7955 | −31.08 |
| 13 | −964.114 | 0.35 | | | | |
| 14 | 30.262 | 2.66 | 1.95906 | 17.5 | 0.6264 | 26.08 |
| 15 | −137.832 | (Variable) | | | | |
| 16 (Stop) | ∞ | (Variable) | | | | |
| 17 | 13.469 | 5.09 | 1.49700 | 81.5 | 0.8258 | 32.00 |
| 18 | 76.925 | 3.66 | | | | |
| 19* | 10.337 | 5.07 | 1.49700 | 81.5 | 0.8258 | 19.81 |
| 20* | −173.126 | 0.50 | | | | |
| 21 | −44.421 | 0.70 | 1.83481 | 42.7 | 0.7533 | −10.24 |
| 22 | 10.663 | 1.00 | | | | |
| 23 | 23.201 | 0.60 | 1.77250 | 49.6 | 0.7955 | −29.18 |
| 24 | 11.304 | 3.84 | 1.49700 | 81.5 | 0.8258 | 17.42 |
| 25 | −32.779 | 0.15 | | | | |
| 26 | 11.288 | 3.21 | 1.49700 | 81.5 | 0.8258 | 21.63 |
| 27 | −204.965 | (Variable) | | | | |
| 28 | 615.839 | 1.70 | 1.95906 | 17.5 | 0.6264 | 21.91 |
| 29 | −21.722 | 0.40 | 1.90525 | 35.0 | 0.7094 | −7.55 |
| 30 | 10.055 | (Variable) | | | | |

-continued

| Unit: mm | | | | | | |
|---|---|---|---|---|---|---|
| 31 | 13.111 | 0.60 | 1.84666 | 23.8 | 0.6614 | −31.95 |
| 32 | 8.645 | 3.68 | 1.71999 | 50.2 | 0.7931 | 9.98 |
| 33 | −34.927 | | | | | |

Aspherical surface data

Nineteenth surface

K = −1.02642e+000  A4 = 9.20649e−005  A6 = 4.07073e−007  A8 = 3.54427e−009

Twentieth surface

K = 0.00000e+000  A4 = 1.10104e−004  A6 = −2.47915e−007

Various data
Zoom ratio 29.50

| | Wide angle | Intermediate | Telephoto |
|---|---|---|---|
| Focal length | 5.49 | 42.58 | 161.83 |
| F-number | 1.65 | 3.00 | 4.94 |
| Half angle of view | 30.26 | 4.30 | 1.13 |
| Image height | 3.20 | 3.20 | 3.20 |
| Total lens length | 126.78 | 126.78 | 126.78 |
| BF | 6.54 | 6.54 | 6.54 |
| d7 | 1.00 | 33.64 | 40.80 |
| d15 | 41.98 | 9.35 | 2.18 |
| d16 | 14.69 | 10.15 | 1.40 |
| d27 | 2.50 | 7.13 | 2.51 |
| d30 | 2.85 | 2.77 | 16.14 |

Zoom lens unit data

| Unit | First surface | Focal length |
|---|---|---|
| 1 | 1 | 57.87 |
| 2 | 8 | −10.29 |
| 3 | 16 | ∞ |
| 4 | 17 | 20.23 |
| 5 | 28 | −11.66 |
| 6 | 31 | 14.66 |

Zoom locus data

B1 = −4.24064e+001  B2 = 6.03486e+002  B3 = −5.78117e+003
B4 = 3.01062e+004  B5 = −9.05595e+004  B6 = 1.62315e+005
B7 = −1.72545e+005  B8 = 1.03219e+005  B9 = −2.98498e+004
B10 = 2.52125e+003

NUMERICAL EXAMPLE 6

| Unit: mm | | | | | | |
|---|---|---|---|---|---|---|
| Surface data | | | | | | |
| Surface number | r | d | nd | νd | θct | Focal length |
| 1 | 265.987 | 1.60 | 1.83481 | 42.7 | 0.7533 | −72.64 |
| 2 | 49.247 | 4.85 | 1.49700 | 81.5 | 0.8258 | 84.78 |
| 3 | −282.143 | 0.15 | | | | |
| 4 | 49.911 | 3.92 | 1.49700 | 81.5 | 0.8258 | 101.47 |
| 5 | 4,720.766 | 0.10 | | | | |
| 6 | 38.999 | 3.05 | 1.49700 | 81.5 | 0.8258 | 141.95 |
| 7 | 84.947 | (Variable) | | | | |
| 8 | 21.337 | 0.80 | 1.83481 | 42.7 | 0.7533 | −41.55 |
| 9 | 12.985 | 2.91 | | | | |
| 10 | 98.809 | 0.60 | 1.80400 | 46.5 | 0.7716 | −22.77 |
| 11 | 15.404 | 3.02 | | | | |
| 12 | −30.355 | 0.60 | 1.77250 | 49.6 | 0.7955 | −39.07 |
| 13 | 5,366.957 | 6.75 | | | | |
| 14 | 56.802 | 2.23 | 1.95906 | 17.5 | 0.6264 | 56.15 |
| 15 | −1,016.384 | (Variable) | | | | |
| 16 (Stop) | ∞ | (Variable) | | | | |
| 17 | 13.506 | 4.21 | 1.49700 | 81.5 | 0.8258 | 31.58 |

-continued

| Unit: mm | | | | | |
|---|---|---|---|---|---|
| 18 | 86.780 | 2.13 | | | |
| 19* | 12.817 | 4.66 | 1.49700 | 81.5 | 0.8258 | 19.30 |
| 20* | −33.522 | 0.50 | | | |
| 21 | −33.493 | 0.70 | 1.83481 | 42.7 | 0.7533 | −13.15 |
| 22 | 16.492 | 0.54 | | | |
| 23 | 29.446 | 0.60 | 1.80400 | 46.5 | 0.7716 | −79.66 |
| 24 | 19.989 | 3.52 | 1.49700 | 81.5 | 0.8258 | 18.15 |
| 25 | −15.476 | 0.14 | | | |
| 26 | 15.761 | 2.27 | 1.49700 | 81.5 | 0.8258 | 27.93 |
| 27 | −110.714 | (Variable) | | | |
| 28 | −58.757 | 1.11 | 1.95906 | 17.5 | 0.6264 | 27.04 |
| 29 | −18.156 | 0.40 | 1.90525 | 35.0 | 0.7094 | −5.49 |
| 30 | 6.916 | (Variable) | | | |
| 31 | 17.619 | 0.60 | 1.84666 | 23.8 | 0.6614 | −25.47 |
| 32 | 9.545 | 3.37 | 1.71999 | 50.2 | 0.7931 | 8.64 |
| 33 | −15.246 | | | | |

Aspherical surface data

Nineteenth surface

K = −1.20190e+000  A4 = 2.45902e−005  A6 = 1.44830e−007  A8 = −4.63444e−010

Twentieth surface

K = 0.00000e+000  A4 = 1.56539e−004  A6 = −3.06033e−007

Various data
Zoom ratio 14.50

| | Wide angle | Intermediate | Telephoto |
|---|---|---|---|
| Focal length | 6.49 | 45.06 | 94.07 |
| F-number | 1.65 | 3.00 | 4.93 |
| Half angle of view | 26.26 | 4.06 | 1.95 |
| Image height | 3.20 | 3.20 | 3.20 |
| Total lens length | 119.83 | 119.83 | 119.83 |
| BF | 5.07 | 5.07 | 5.07 |
| d7 | 1.00 | 33.64 | 40.80 |
| d15 | 41.79 | 9.16 | 1.99 |
| d16 | 11.99 | 4.16 | 1.40 |
| d27 | 2.52 | 3.41 | 2.59 |
| d30 | 2.12 | 9.06 | 12.64 |

Zoom lens unit data

| Unit | First surface | Focal length |
|---|---|---|
| 1 | 1 | 66.33 |
| 2 | 8 | −14.82 |
| 3 | 16 | ∞ |
| 4 | 17 | 15.01 |
| 5 | 28 | −6.86 |
| 6 | 31 | 12.78 |

Zoom locus data

B1 = −4.78538e+001  B2 = 7.74897e+002  B3 = −7.31266e+003
B4 = 3.48607e+004  B5 = −9.36072e+004  B6 = 1.52987e+005
B7 = −1.58151e+005  B8 = 1.03085e+005  B9 = −3.94632e+004
B10 = 6.86340e+003

NUMERICAL EXAMPLE 7

| Unit: mm | | | | | | |
|---|---|---|---|---|---|---|
| Surface data | | | | | | |
| Surface number | r | d | nd | vd | θct | Focal length |
| 1 | 216.197 | 1.60 | 1.83481 | 42.7 | 0.7533 | −60.47 |
| 2 | 40.786 | 10.69 | 1.49700 | 81.5 | 0.8258 | 70.82 |
| 3 | −234.581 | 0.15 | | | | |
| 4 | 45.549 | 6.80 | 1.49700 | 81.5 | 0.8258 | 82.06 |

-continued

| Unit: mm | | | | | | |
|---|---|---|---|---|---|---|
| 5 | −370.602 | 0.10 | | | | |
| 6 | 47.545 | 3.71 | 1.49700 | 81.5 | 0.8258 | 136.99 |
| 7 | 153.523 | (Variable) | | | | |
| 8 | 163.141 | 0.80 | 1.83481 | 42.7 | 0.7533 | −11.76 |
| 9 | 9.239 | 4.22 | | | | |
| 10 | −755.048 | 0.60 | 1.80400 | 46.5 | 0.7716 | −48.67 |
| 11 | 41.282 | 1.65 | | | | |
| 12 | −34.651 | 0.60 | 1.77250 | 49.6 | 0.7955 | −28.45 |
| 13 | 60.533 | 0.04 | | | | |
| 14 | 21.661 | 2.87 | 1.95906 | 17.5 | 0.6264 | 25.51 |
| 15 | 176.665 | (Variable) | | | | |
| 16 (Stop) | ∞ | (Variable) | | | | |
| 17 | 13.632 | 4.77 | 1.43875 | 94.9 | 0.8373 | 39.30 |
| 18 | 58.133 | 4.28 | | | | |
| 19* | 10.283 | 5.24 | 1.43875 | 94.9 | 0.8373 | 25.86 |
| 20* | 92.592 | 1.10 | | | | |
| 21 | −58.282 | 0.70 | 1.64000 | 60.1 | 0.8645 | −14.34 |
| 22 | 10.947 | 0.94 | | | | |
| 23 | 22.419 | 0.60 | 1.64000 | 60.1 | 0.8645 | −31.86 |
| 24 | 10.566 | 4.20 | 1.43875 | 94.9 | 0.8373 | 17.90 |
| 25 | −26.885 | 2.28 | | | | |
| 26 | 10.292 | 3.07 | 1.43875 | 94.9 | 0.8373 | 26.59 |
| 27 | 79.393 | (Variable) | | | | |
| 28 | 140.722 | 1.11 | 1.95906 | 17.5 | 0.6264 | 97.53 |
| 29 | −277.882 | 0.40 | 1.90525 | 35.0 | 0.7094 | −10.64 |
| 30 | 9.986 | (Variable) | | | | |
| 31 | 10.491 | 0.60 | 1.84666 | 23.8 | 0.6614 | −43.09 |
| 32 | 7.934 | 4.78 | 1.69680 | 55.5 | 0.8330 | 10.22 |
| 33 | −52.312 | | | | | |

Aspherical surface data

Nineteenth surface

K = −1.58516e+000   A4 = 1.64094e−004   A6 = 3.20170e−007   A8 = 6.36155e−009

Twentieth surface

K = 0.00000e+000   A4 = 1.37584e−004   A6 = 5.19101e−007

Various data
Zoom ratio 49.48

| | Wide angle | Intermediate | Telephoto |
|---|---|---|---|
| Focal length | 4.19 | 38.51 | 207.26 |
| F-number | 1.65 | 3.09 | 5.77 |
| Half angle of view | 37.38 | 4.75 | 0.88 |
| Image height | 3.20 | 3.20 | 3.20 |
| Total lens length | 148.32 | 148.32 | 148.32 |
| BF | 4.72 | 4.72 | 4.72 |
| d7 | 0.92 | 33.56 | 40.72 |
| d15 | 43.09 | 10.45 | 3.29 |
| d16 | 27.01 | 18.20 | 4.09 |
| d27 | 2.61 | 6.61 | 2.67 |
| d30 | 2.09 | 6.89 | 24.95 |

Zoom lens unit data

| Unit | First surface | Focal length |
|---|---|---|
| 1 | 1 | 56.78 |
| 2 | 8 | −9.37 |
| 3 | 16 | ∞ |
| 4 | 17 | 22.42 |
| 5 | 28 | −12.03 |
| 6 | 31 | 13.71 |

Zoom locus data

B1 = −5.53472e+001   B2 = 6.45831e+002   B3 = −6.00774e+003
B4 = 3.02295e+004   B5 = −8.87432e+004   B6 = 1.57802e+005
B7 = −1.68180e+005   B8 = 1.00582e+005   B9 = −2.80420e+004
B10 = 1.74616e+003

NUMERICAL EXAMPLE 8

| | Unit: mm | | | | | |
|---|---|---|---|---|---|---|
| | Surface data | | | | | |
| Surface number | r | d | nd | vd | θct | Focal length |
| 1 | 94.601 | 1.48 | 1.80400 | 46.5 | 0.7716 | −100.37 |
| 2 | 43.246 | 5.96 | 1.49700 | 81.5 | 0.8258 | 84.40 |
| 3 | −1,333.376 | 0.15 | | | | |
| 4 | 96.543 | 1.32 | 1.69680 | 55.5 | 0.8330 | −79.86 |
| 5 | 35.103 | 5.67 | 1.49700 | 81.5 | 0.8258 | 74.10 |
| 6 | 709.980 | 0.15 | | | | |
| 7 | 35.264 | 5.37 | 1.49700 | 81.5 | 0.8258 | 73.70 |
| 8 | 897.777 | (Variable) | | | | |
| 9 | 100.464 | 0.72 | 1.83481 | 42.7 | 0.7533 | −10.99 |
| 10 | 8.377 | 3.56 | | | | |
| 11 | −97.297 | 0.52 | 1.77250 | 49.6 | 0.7955 | −20.46 |
| 12 | 18.917 | 2.61 | | | | |
| 13 | −16.315 | 0.51 | 1.69680 | 55.5 | 0.8330 | −23.83 |
| 14 | −952.924 | 0.10 | | | | |
| 15 | 33.316 | 2.90 | 1.85478 | 24.8 | 0.6739 | 17.17 |
| 16 | −25.188 | (Variable) | | | | |
| 17 (Stop) | ∞ | (Variable) | | | | |
| 18 | 14.745 | 5.29 | 1.49700 | 81.5 | 0.8258 | 35.21 |
| 19 | 82.484 | 3.33 | | | | |
| 20* | 13.718 | 4.18 | 1.58313 | 59.4 | 0.8271 | 28.41 |
| 21* | 70.800 | 0.54 | | | | |
| 22 | 874.018 | 0.60 | 1.74951 | 35.3 | 0.7308 | −13.42 |
| 23 | 9.942 | 5.03 | 1.49700 | 81.5 | 0.8258 | 17.57 |
| 24 | −59.730 | 0.15 | | | | |
| 25 | 19.698 | 3.47 | 1.49700 | 81.5 | 0.8258 | 15.37 |
| 26 | −11.743 | 0.50 | 1.71300 | 53.9 | 0.8194 | −21.90 |
| 27 | −48.168 | (Variable) | | | | |
| 28 | 2,095.961 | 1.51 | 1.95906 | 17.5 | 0.6264 | 14.17 |
| 29 | −13.675 | 0.50 | 1.91082 | 35.3 | 0.7128 | −5.71 |
| 30 | 8.539 | (Variable) | | | | |
| 31 | 10.849 | 4.30 | 1.60311 | 60.6 | 0.8321 | 8.82 |
| 32 | −8.875 | 0.50 | 1.84666 | 23.8 | 0.6614 | −24.86 |
| 33 | −15.742 | | | | | |

Aspherical surface data

Twentieth surface

K = −5.80930e−001  A4 = 1.16634e−005  A6 = 2.64790e−007  A8 = −5.72607e−009
A10 = 3.75124e−012

Twenty-first surface

K = 0.00000e+000  A4 = 6.45917e−005  A6 = 5.17998e−007  A8 = −2.14030e−008
A10 = 1.62997e−010

Various data
Zoom ratio 39.10

| | Wide angle | Intermediate | Telephoto |
|---|---|---|---|
| Focal length | 4.50 | 50.60 | 175.98 |
| F-number | 1.65 | 3.10 | 4.94 |
| Half angle of view | 35.41 | 3.62 | 1.04 |
| Image height | 3.20 | 3.20 | 3.20 |
| Total lens length | 129.41 | 129.41 | 129.41 |
| BF | 5.40 | 5.40 | 5.40 |
| d8 | 0.65 | 38.37 | 46.65 |
| d16 | 47.80 | 10.08 | 1.80 |
| d17 | 9.14 | 2.40 | 1.40 |
| d27 | 1.99 | 8.43 | 1.99 |
| d30 | 3.50 | 3.80 | 11.24 |

Zoom lens unit data

| Unit | First surface | Focal length |
|---|---|---|
| 1 | 1 | 63.25 |
| 2 | 9 | −9.06 |
| 3 | 17 | ∞ |
| 4 | 18 | 17.98 |

-continued

Unit: mm

| | | |
|---|---|---|
| 5 | 28 | −9.75 |
| 6 | 31 | 12.90 |

Zoom locus data

| | | |
|---|---|---|
| B1 = −5.85119e+001 | B2 = 6.34619e+002 | B3 = −5.57210e+003 |
| B4 = 2.61931e+004 | B5 = −6.45757e+004 | B6 = 7.59750e+004 |
| B7 = −1.27588e+004 | B8 = −6.49905e+004 | B9 = 6.45864e+004 |
| B10 = −1.94412e+004 | | |

According to the present invention, it is possible to obtain the zoom lens with which chromatic aberration is sufficiently corrected in the wavelength range of from visible light to near-infrared light while the zoom lens is compact and has a high zoom ratio, and the image pickup apparatus including the zoom lens.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A zoom lens comprising in order from an object side to an image side:
    a first lens unit having a positive refractive power;
    a second lens unit having a negative refractive power;
    a third lens unit having a positive refractive power; and
    a rear lens group including at least one lens unit,
    wherein an interval between each pair of adjacent lens units changes during zooming,
    wherein the first lens unit includes at least three positive lenses and consists of at most five lenses,
    wherein the third lens unit includes at least two negative lenses and at least three positive lenses, and
    wherein the following conditions are satisfied:

$-0.0030 \leq (\theta Ctn_{ave} - \theta Ctp_{ave})/(\nu dn_{ave} - \nu dp_{ave}) \leq 0.0040;$ $30.0 \leq \nu dn_{ave} \leq 75.0;$ $0.3 \leq BF/fw \leq 3.0;$ and $7.7 \leq f1/fw \leq 20.0,$ where $\theta Ctn_{ave}$ represents an average value of partial dispersion ratios of materials of two negative lenses having the strongest refractive powers of the at least two negative lenses, $\theta Ctp_{ave}$ represents an average value of partial dispersion ratios of materials of three positive lenses having the strongest refractive powers of the at least three positive lenses, $\nu dn_{ave}$ represents an average value of Abbe numbers of the materials of the two negative lenses, $\nu dp_{ave}$ represents an average value of Abbe numbers of the materials of the three positive lenses, BF represents an air-equivalent length from a last surface of the zoom lens to an image plane, f1 represents a focal length of the first lens unit, and fw represents a focal length of the zoom lens at a wide angle end.

2. The zoom lens according to claim 1, wherein the following condition is satisfied:

$1.1 \leq f3/fw \leq 8.2,$ where f3 represents a focal length of the third lens unit.

3. The zoom lens according to claim 1, wherein the following condition is satisfied:

$5.0 \leq ft/fw \leq 90.0,$ where ft represents a focal length of the zoom lens at a telephoto end.

4. The zoom lens according to claim 1, wherein the first lens unit is configured not to move for zooming.

5. The zoom lens according to claim 1, wherein the following condition is satisfied:

$-12.0 \leq f1/f2 \leq -2.0,$ where f2 represents a focal length of the second lens unit.

6. The zoom lens according to claim 1, wherein the following condition is satisfied:

$0.3 \leq TD/ft \leq 2.0,$ where TD represents a distance on an optical axis from an optical surface closest to the object side to an image plane, and ft represents a focal length of the zoom lens at a telephoto end.

7. The zoom lens according to claim 1, further comprising an aperture stop arranged on the object side with respect to the third lens unit.

8. The zoom lens according to claim 1, wherein the following condition is satisfied:

$-0.0020 \leq (\theta Ctn_{ave} - \theta Ctp_{ave})/(\nu dn_{ave} - \nu dp_{ave}) \leq 0.0030.$ 9. The zoom lens according to claim 1, wherein the following condition is satisfied:

$35.0 \leq \nu dn_{ave} \leq 65.0.$

10. The zoom lens according to claim 1, wherein the zoom lens comprises a plurality of lens units consisting of, in order from the object side to the image side, the first lens unit, the second lens unit, the third lens unit, a fourth lens unit and a fifth lens unit.

11. An image pickup apparatus comprising:
    a zoom lens; and
    an image pickup element configured to receive light of an image formed by the zoom lens,
    wherein the zoom lens comprises in order from an object side to an image side:
    a first lens unit having a positive refractive power;
    a second lens unit having a negative refractive power;
    a third lens unit having a positive refractive power; and
    a rear lens group including at least one lens unit,
    wherein an interval between each pair of adjacent lens units changes during zooming,
    wherein the first lens unit includes at least three positive lenses and consists of at most five lenses,
    wherein the third lens unit includes at least two negative lenses and at least three positive lenses, and wherein the following conditions are satisfied:

$$-0.0030 \leq (\theta Ctn_{ave} - \theta Ctp_{ave})/(vdn_{ave} - vdp_{ave}) \leq 0.0040;$$

$$30.0 \leq vdn_{ave} \leq 75.0;$$

$$0.3 \leq BF/fw \leq 3.0; \text{ and}$$

$$7.7 \leq f1/fw \leq 20.0,$$

where $\theta Ctn_{ave}$ represents an average value of partial dispersion ratios of materials of two negative lenses having the strongest refractive powers of the at least two negative lenses, $\theta Ctpave$ represents an average value of partial dispersion ratios of materials of three positive lenses having the strongest refractive powers of the at least three positive lenses, vdnave represents an average value of Abbe numbers of the materials of the two negative lenses, vdpave represents an average value of Abbe numbers of the materials of the three positive lenses, BF represents an air-equivalent length from a last surface of the zoom lens to an image plane, f1 represents a focal length of the first lens unit, and fw represents a focal length of the zoom lens at a wide angle end.

12. An image pickup system comprising:
a zoom lens; and
a controller configured to control the zoom lens,
wherein the zoom lens comprises in order from an object side to an image side:
a first lens unit having a positive refractive power;
a second lens unit having a negative refractive power;
a third lens unit having a positive refractive power; and
a rear lens group including at least one lens unit,
wherein an interval between each pair of adjacent lens units changes during zooming,
wherein the first lens unit includes at least three positive lenses and consists of at most five lenses,
wherein the third lens unit includes at least two negative lenses and at least three positive lenses, and
wherein the following conditions are satisfied:

$$-0.0030 \leq (\theta Ctn_{ave} - \theta Ctp_{ave})/(vdn_{ave} - vdp_{ave}) \leq 0.0040;$$

$$30.0 \leq vdn_{ave} \leq 75.0;$$

$$0.3 \leq BF/fw \leq 3.0; \text{ and}$$

$$7.7 \leq f1/fw \leq 20.0,$$

where $\theta Ctnave$ represents an average value of partial dispersion ratios of materials of two negative lenses having the strongest refractive powers of the at least two negative lenses, $\theta Ctpave$ represents an average value of partial dispersion ratios of materials of three positive lenses having the strongest refractive powers of the at least three positive lenses, vdnave represents an average value of Abbe numbers of the materials of the two negative lenses, vdpave represents an average value of Abbe numbers of the materials of the three positive lenses, BF represents an air-equivalent length from a last surface of the zoom lens to an image plane, f1 represents a focal length of the first lens unit, and fw represents a focal length of the zoom lens at a wide angle end.

13. The image pickup system according to claim 12, wherein the controller is configured to transmit a control signal for controlling the zoom lens.

14. The image pickup system according to claim 12, wherein the controller includes an operating device configured to operate the zoom lens.

15. The image pickup system according to claim 12, further comprising a display configured to display information on zooming of the zoom lens.

* * * * *